United States Patent
Maaroufi et al.

(10) Patent No.: US 10,681,037 B2
(45) Date of Patent: Jun. 9, 2020

(54) TERMINAL AUTHENTICATION

(71) Applicant: Amadeus S.A.S., Biot (FR)

(72) Inventors: Mohamed-Amine Maaroufi, Antibes (FR); Alexandre Barras, Opio (FR); Ayoub Choukouk, Antibes (FR)

(73) Assignee: AMADEUS S.A.S., Biot (FR)

( * ) Notice: Subject to any disclaimer, the term of this patent is extended or adjusted under 35 U.S.C. 154(b) by 374 days.

(21) Appl. No.: 15/637,162

(22) Filed: Jun. 29, 2017

(65) Prior Publication Data

US 2019/0007384 A1    Jan. 3, 2019

(51) Int. Cl.
| | |
|---|---|
| H04L 29/06 | (2006.01) |
| H04W 12/06 | (2009.01) |
| G06F 21/31 | (2013.01) |
| H04W 12/00 | (2009.01) |
| G06F 21/45 | (2013.01) |

(52) U.S. Cl.
CPC ............ *H04L 63/083* (2013.01); *G06F 21/31* (2013.01); *G06F 21/45* (2013.01); *H04L 63/0428* (2013.01); *H04L 63/08* (2013.01); *H04L 63/0876* (2013.01); *H04W 12/00504* (2019.01); *H04W 12/00508* (2019.01); *H04W 12/06* (2013.01); *H04L 63/0861* (2013.01); *H04L 2463/082* (2013.01)

(58) Field of Classification Search
CPC ... H04L 63/083; H04L 63/0428; G06F 21/31; H04W 12/06
See application file for complete search history.

(56) References Cited

U.S. PATENT DOCUMENTS

| | | | |
|---|---|---|---|
| 9,055,061 B2 | 6/2015 | Israel | |
| 9,467,293 B1* | 10/2016 | Brainard | G06Q 20/3823 |
| 9,692,879 B1* | 6/2017 | Lack | H04M 1/72577 |
| 10,091,188 B2* | 10/2018 | Xiao | H04L 63/083 |
| 2005/0039025 A1* | 2/2005 | Main | H04N 21/235 713/182 |
| 2006/0117377 A1 | 6/2006 | Frenkiel et al. | |
| 2008/0016557 A1* | 1/2008 | Yang | H04L 63/0853 726/9 |

(Continued)

FOREIGN PATENT DOCUMENTS

EP    1669833 A1    6/2006

OTHER PUBLICATIONS

National Institute of Industrial Property, Preliminary Search Report and Written Opinion issued in French Application No. 1756027 dated Feb. 8, 2018.
Alaca et al., "Device fingerprinting for augmenting web authentication: classification and analysis of methods", Proceedings of the 32nd Annual Conference on Computer Security Applications, pp. 289-301, Los Angeles, California, USA—Dec. 5-8, 2016.

(Continued)

*Primary Examiner* — Shanto Abedin
(74) *Attorney, Agent, or Firm* — Thompson Hine LLP

(57) ABSTRACT

Methods, systems, and computer program products for authenticating a terminal with a server based on multiple environmental factors. Each of the multiple environmental factors relates to a configurable hardware-independent characteristic of the terminal. Each of the multiple environmental factors is defined at least by an identifier and a value. The identifier identifies a respective environmental factor and the value indicates a state of the respective configurable hardware-independent characteristic. The multiple environmental factors constitute an environmental authentication information for authenticating the terminal with the server.

17 Claims, 14 Drawing Sheets

(56) References Cited

U.S. PATENT DOCUMENTS

| | | |
|---|---|---|
| 2013/0191724 A1 | 7/2013 | Locufier |
| 2014/0123255 A1 | 5/2014 | Etchegoyen |
| 2014/0366128 A1* | 12/2014 | Venkateswaran ....... H04L 63/08 726/19 |
| 2015/0012748 A1* | 1/2015 | Jiang .................. G06F 21/6209 713/168 |
| 2016/0203468 A1* | 7/2016 | Chen .................... G06Q 20/401 705/75 |
| 2016/0285683 A1* | 9/2016 | Ulrich ................. H04L 41/0806 |
| 2016/0294802 A1* | 10/2016 | Xiao ..................... H04L 63/083 |
| 2016/0308858 A1* | 10/2016 | Nordstrom ............ H04L 63/068 |
| 2016/0359838 A1* | 12/2016 | Dasgupta .............. H04L 63/083 |
| 2017/0012969 A1* | 1/2017 | Li ....................... H04L 63/0838 |

OTHER PUBLICATIONS

Spooren et al., "Mobile device fingerprinting considered harmful for risk-based authentication", Proceedings of the Eighth European Workshop on System Security, Article No. 6, Bordeaux, France—Apr. 21-21, 2015.

Preuveneers et al., "SmartAuth: dynamic context fingerprinting for continuous user authentication", Proceedings of the 30th Annual ACM Symposium on Applied Computing, pp. 2185-2191, Salamanca, Spain—Apr. 13-17, 2015.

Hunter et al., "Remote fingerprinting and multisensor data fusion", 2012 Information Security for South Africa, Johannesburg, Gauteng, pp. 1-8.

European Patent Office, Official Action issued in Application No. 18 180 850.2 dated Oct. 11, 2019.

* cited by examiner

TERMINAL AUTHENTICATION

TECHNICAL FIELD

The present invention generally relates to terminal authentication and, more specifically, relates to generating a secure password and secure login flows.

BACKGROUND

Various password generation and terminal or user authentication mechanisms are known. Conventional authentication is often time consuming and a user needs to remember his or her credentials, such as a password. Strong classic passwords are difficult to remember and can be stolen easily. Some authentication procedures include multiple stages in which the user has to input credentials and verification information multiple times. Password-less authentication generally requires the introduction of equipment or devices, such as fingerprint scanners or iris scanners.

SUMMARY

According to an embodiment, a method is provided to authenticate a terminal with a server based on multiple environmental factors. Each of the multiple environmental factors relates to a configurable hardware-independent characteristic of the terminal. Each of the multiple environmental factors is defined at least by an identifier and a value. The identifier identifies a respective environmental factor and the value indicates a state of the respective configurable hardware-independent characteristic. The multiple environmental factors constitute an environmental authentication information for authenticating the terminal with the server. The method is performed by the terminal.

The terminal registers, at first point of time, a registration environmental authentication information of the terminal. To this end, the terminal extracts, for each of the multiple environmental factors, the respective state of the related configurable hardware-independent characteristic of the terminal at the first point of time and sets the respective value of each of the multiple environmental factors depending on the respective state at the first point of time. The terminal generates the registration environmental authentication information based on the values of the multiple environmental factors set at the first point of time. The terminal sends the registration environmental authentication information to the server for storing the first environmental authentication information.

The terminal authenticates with the server at a second point of time later than the first point of time. To this end, the terminal extracts, for at least a plurality of the multiple environmental factors, the respective state of the related configurable hardware-independent characteristic of the terminal at the second point of time and sets the respective value of each of the plurality of the multiple environmental factors depending on the respective state at the second point of time. The terminal generates a current environmental authentication information based on the values of the multiple environmental factors set at the second point of time. The terminal sends the current environmental authentication information to the server for authenticating the terminal with the server.

According to an embodiment, a terminal is provided which is arranged to implement the method above.

According to an embodiment, a computer program product is provided which implements the method above when being executed on the terminal.

According to an embodiment, a method to authenticate a terminal with a server based on multiple environmental factors. Each of the multiple environmental factors relates to a configurable hardware-independent characteristic of the terminal. Each of the multiple environmental factors is defined at least by an identifier and a value. The identifier identifies a respective environmental factor and the value indicates a state of the respective configurable hardware-independent characteristic. The multiple environmental factors constitute an environmental authentication information for authenticating the terminal with the server. The method is performed by the server.

At a first point of time, the terminal is registered with the server based on a registration environmental authentication information of the terminal. To this end, the server receives the registration environmental authentication information from the terminal. The server stores the registration environmental authentication information.

The server authenticates the terminal at a second point of time later than the first point of time. To this end, the server receives a current environmental authentication information from the terminal. The server compares the received current environmental authentication information with the stored registration environmental authentication information. In response to determining that the current environmental authentication information is substantially identical to the registration environmental authentication information, the server authenticates the terminal.

According to an embodiment, a server is provided which is arranged to implement the method above.

According to an embodiment, a computer program product is provided which implements the method above when being executed on the server.

According to embodiments of the invention, authentication may be provided with increased security without compromising user usability and increase system complexity.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE FIGURES

The present invention will be described with reference to accompanying figures. Similar reference numbers generally indicate identical or functionally similar elements.

DETAILED DESCRIPTION

Figure 1:
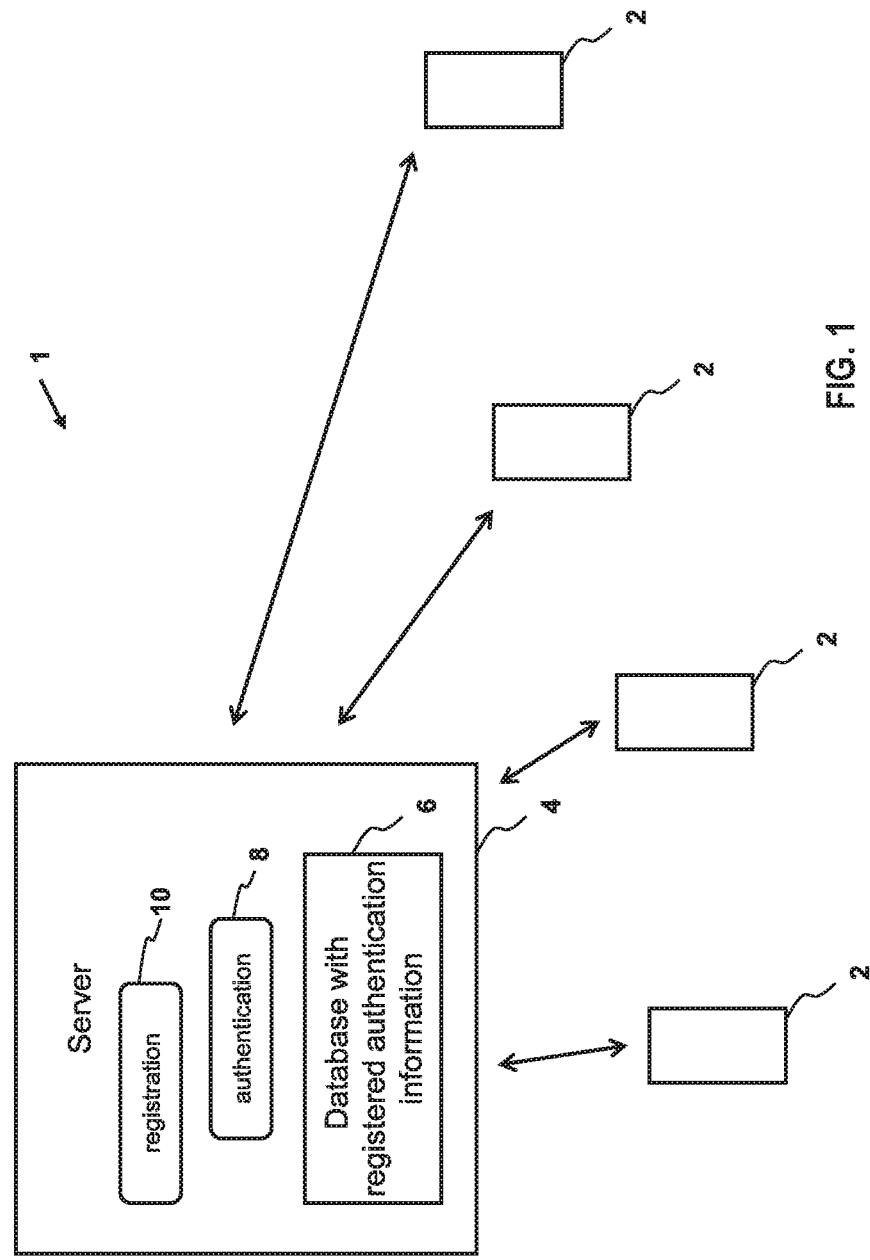
FIG. 1 schematically depicts a system with a server and multiple terminals.

With reference to FIG. 1, the terminal 2 encompasses all sorts of stationary or mobile user or client machines such as personal computers, laptops, tablet computers, phones, smartphones, television devices, etc. The authentication procedure may be employed for any sorts of authentication either on the terminal itself or on a remote machine. For example, a user authenticates herself/himself locally on the terminal as an authorized person for a local service implemented by a server process running on the terminal 2 or remotely on a server machine as an authorized person for a remote service implemented by a service process running on the remote server machine. Hence, the server 4 as used herein encompasses both server processes running remote from the terminal 2 on any remote server machine as well as local server processes running locally on the terminal itself.

The terminals 2 and server 4 are connected by any suitable communication interface such as a network connection via the Internet. The server 4 includes a database 6 for storing registration environmental authentication information as described below. The database 6 may be a relational database using a relational database management system (RDBMS). The server may also include functional sub-components such as a registration module 10 and an authentication module 8. Similar counterpart functional modules may also be present on the terminal. Terminals 2 and server 4 form system 1.

The authentication procedure described herein is based on multiple characteristics of the terminal 2. At least some of these multiple characteristics of the terminal 2 are configurable and/or hardware-independent and therefore generally dynamically changeable. These dynamically changeable terminal characteristics are also referred to as environmental factors because they represent at least a part of the dynamically changeable setup and environment of the terminal. The term environment generally refers to all specific characteristics of the terminal 2, including configuration aspects, software present on and/or executed by the terminal 2 and/or states or sub-states of the terminal 2 constituted by user input.

Examples of environmental factors include one or more of a storage content of the terminal, software processes currently running on the terminal (e.g., such as the number, types or specific processes running on the terminal at a point of time), software programs installed on the terminal (including sub-states of installed software programs such as the existence of a particular plug-in for a particular software program), an operating system of the terminal (e.g., a specific version of the terminal's operating system), a current state of a web browser application currently executed by the terminal, one or more aspects of a current system configuration of the terminal (e.g., a screen luminosity, a system volume, or a display resolution), a connection to an external storage drive, one or more currently opened files (including a number or minimum number of opened files and/or specific opened files), a state of a part of a file system of the terminal (e.g., the existence of a particular folder and/or the number of files in this particular folder), a time elapsed since a state of an certain environmental factor is established (e.g. a minimum time since a USB drive has been inserted), and a user input (e.g., a password set by the user, a fingerprint, or one or more gestures input by the user via the terminal).

The present authentication process can be based any of these environmental factors, any subset of these environmental factors, including multiple individual instances of each environmental factor (such as the existence of three particular folders in the file system of the terminal 2 and/or the number of files stored in each of the three particular folders), or all of these environmental factors. In addition to a plurality of these environmental factors, the authentication procedure may also be based on one or more classic hardware-based factors or terminal-external information such as a fingerprint of the user. The actual environmental and optional hardware-based factors used for the authentication procedure are selected by the user of the terminal and/or prescribed by a policy which is e.g. set by an administrator.

The selected environmental factors (and optional hardware-based factors) are used to compose a password for authentication. To this end, each of the multiple environmental factors is associated with a respective identifier for referencing the environmental factor and for each of the multiple environmental factors, a respective state of the related configurable hardware-independent characteristic of the terminal is determined. An environmental factor is thus defined by at least two parameters. One parameter may be an identifier, which represents a unique identifier of the environmental factor in order to reference to the environmental factor, may serve as a key or index depending on the implementation. Another parameter may be a value, which represents a state of the configurable hardware-independent characteristic of the terminal. Depending on the terminal characteristic of the environmental factor, an environmental factor is of a certain value type, such as discrete values, discrete values specified by a value list (also referred to as enumerated type), or non-discrete values, complex data types, etc.

In practice, the authentication procedure will be based on a larger number of environmental factors such as at least five, at least ten or least twenty environmental factors which relate to various aspects of the terminal's environment and are thus well-diversified in order to promote security. For reasons of illustration, examples described herein use a smaller number of environmental factors. A simple example of a set of environmental factors employed for authenticating the terminal is:

| Environmental factor | Identifier | Value |
| --- | --- | --- |
| operating system | 0 | MS Windows ® 10 |
| number of files in folder C:\Users\User\Desktop | 1 | 12 |
| USB flash drive inserted in USB slot | 2 | yes |
| Browser application executed with first tab set to www.amadeus.com | 3 | yes |

The multiple environmental factors, in particular the values of the environmental factors, constitute an environmental authentication information for authenticating the terminal with the server, i.e. an environmental password. The authentication procedure generally includes two phases, a—usually one-time—registration phase in order to setup and store an environmental password, referred to as registration environmental authentication information, and an authentication phase which is performed after the registration (visualized by the three dots in FIGS. 4 to 12) each time the user or terminal 2 is to be authenticated and which includes a comparison of current environmental authentication information (i.e. environmental authentication information established by the terminal at authentication time) with the registered environmental authentication information.

Both phases are implemented by respective computer program routines which are stored and executed at the terminal and at the server side. In some embodiments, the functionalities described herein are implemented by a web-based service, so that the terminal's environmental data is extracted by a browser plugin as well as a dedicated software (such as the operating system of the terminal). In other embodiments, the functionalities described herein are implemented by an application installed and executed on the terminal 2.

Figure 2:
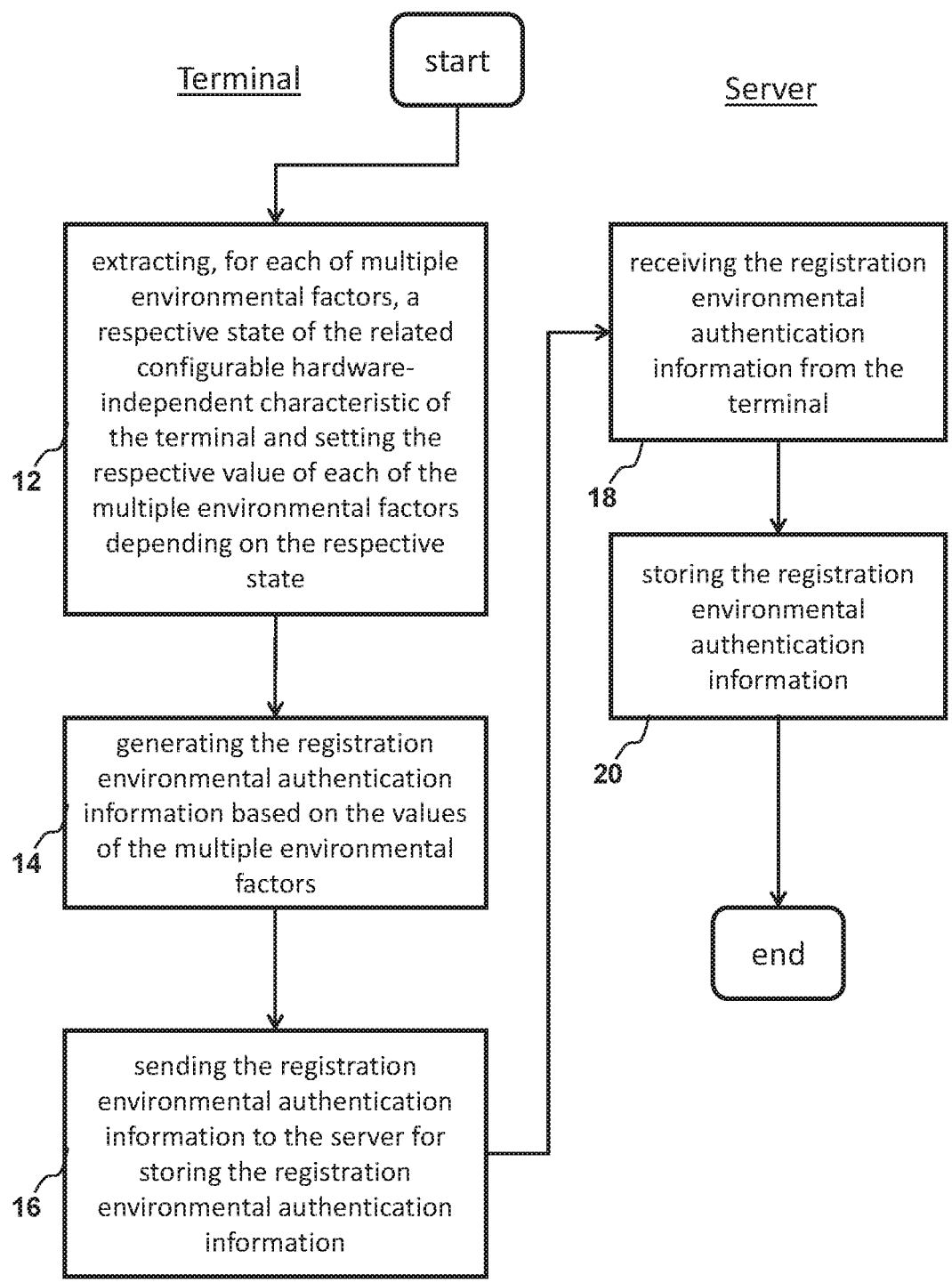
FIG. 2 is a flow chart for a password generation and registration process.

Registration (FIG. 2)

In order to register an environmental password at a first point of time, the terminal collects environmental data available at the terminal. In some embodiments, the user first chooses the environmental factors to be included in the environmental password and the current states of the chosen environmental factors are then determined at the terminal. More specifically, the terminal extracts, at 12, for each of the multiple environmental factors, the respective state of the related configurable hardware-independent characteristic of the terminal and sets the respective value of each of the selected multiple environmental factors depending on the respective state at the first point of time. In other embodiments, the terminal first collects all suitable environmental data and the user is then presented with a list of environmental factors and their respective states in order to select a set of environmental factors to be included in the environmental password. After the user has selected the environmental factors, an environmental password is generated by the terminal, at 14, for registration with the server, which is also referred to as registration environmental authentication information of the terminal hereinafter.

After the registration environmental authentication information is generated, the generated registration environmental authentication information is sent, at 16, to the server. The server receives the environmental authentication information at 18 and stores the registration environmental authentication information e.g., in the database 6 at 20. The server links the registration environmental authentication information to an identifier associated with the terminal and/or user to be authenticated later. As mentioned above, the storage may occur locally at the terminal if the server is located locally as a server application running at the terminal, or may take place remotely if the server is a remote server.

Figure 3:
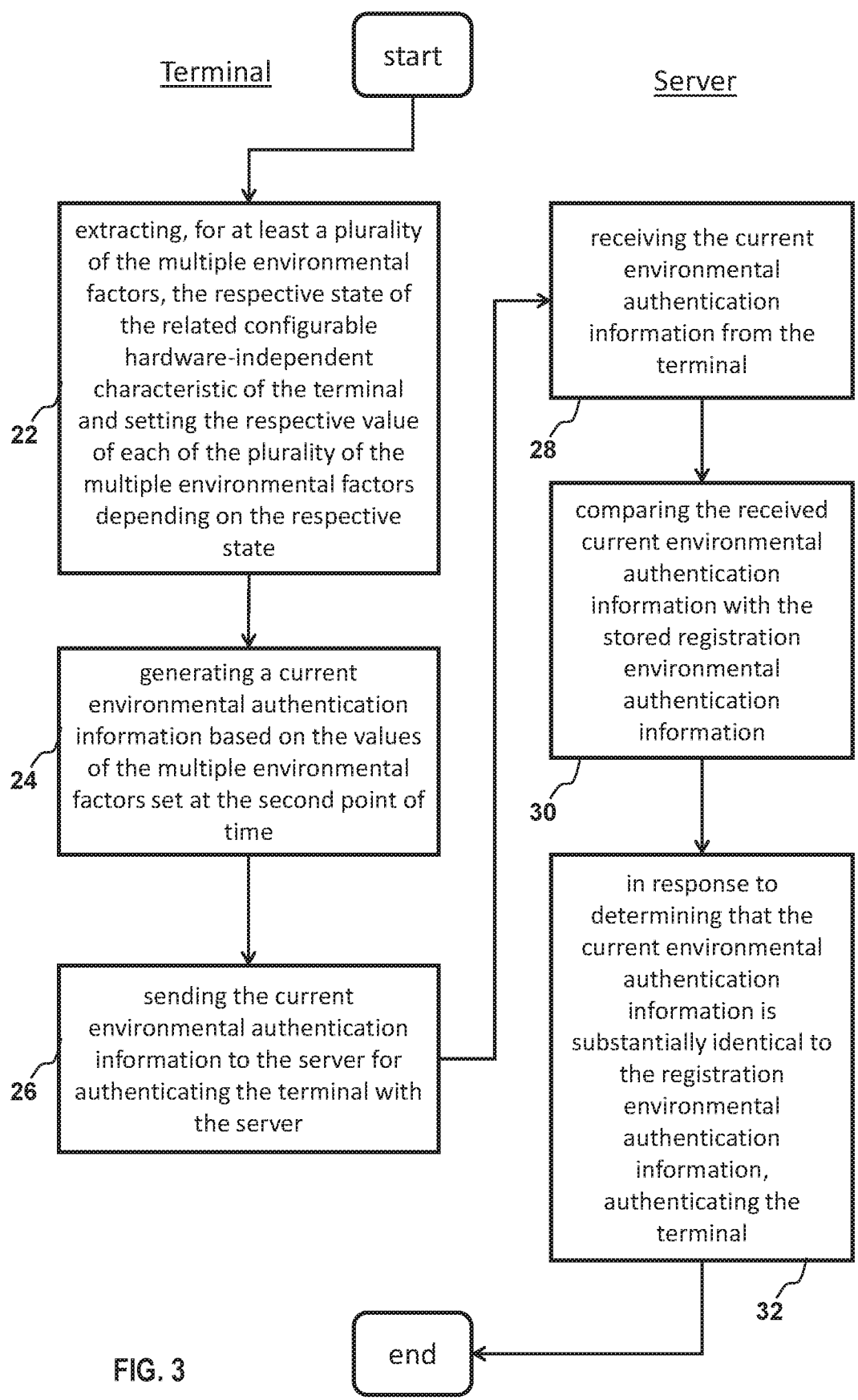
FIG. 3 is a flow chart for authentication process.

Authentication (FIG. 3)

In order to authenticate the user/terminal at a second point of time later than the first point of time, the terminal again collects environmental data available at the terminal. This activity is similar to the environmental data collection at the registration phase, apart from the fact that the environmental factors are now predetermined (they have already been determined during the registration phase) and, thus, do not need to be selected anymore.

On the other hand, in some embodiments, not all predetermined environmental factors that have been set in the registration phase are used during the authentication phase, as will be explained in more detail below. In these embodiments, a subset of the predetermined environmental factors set during the registration phase are selected and their respective states is determined at the terminal.

Hence, the terminal extracts at 22, for at least a plurality of the multiple environmental factors selected in the registration phase, the respective state of the related configurable hardware-independent characteristic of the terminal at the second point of time and sets the respective value of each of the plurality of the multiple environmental factors depending on the respective state at the second point of time. In this manner, the terminal generates a current environmental password at 24, also referred to as current environmental authentication information, based on the values of the multiple environmental factors set at the second point of time. The terminal sends the current environmental authentication information to the server at 26 for authenticating the terminal with the server.

The server receives the current environmental authentication information from the terminal at 28 and compares the received current environmental authentication information at 30 with the registration environmental authentication information that was stored during the registration phase. If the server determines that the current environmental authentication information is substantially identical to the registration environmental authentication information, the server positively authenticates the terminal at 32, e.g., by returning an authentication confirmation message to the terminal. On the other hand, if the server determines that the current environmental authentication information is not substantially identical to the registration environmental authentication information, authentication fails and the server e.g. returns an authentication denial message to the terminal.

In order to ensure that the current environmental authentication information is substantially identical to the registration environmental authentication information, the values of the individual environmental factors constituting the current environmental authentication information need to be substantially identical to the values of the registration environmental authentication information. Hence, for a successful authentication, the terminal is to be put into the same state as the terminal was at the registration.

For some of the environmental factors which are subject to the usual system configuration of the terminal, this will automatically be the case. With respect to the above simplified example, the first environmental factor with identifier=1 will be determined to be identical as long as the operation system of the terminal is not changed and the second environmental factor with identifier=2 will be determined to be identical as long as the number of files in the folder C:\Users\User\Desktop is not changed relative to registration time. Other environmental factors depend on user behavior and the user intentionally sets the terminal to the correct states before authenticating. With respect to the above simplified example, the user inserts a USB flash drive into a USB slot of the terminal in order to set the value of the third environmental factor with identifier=3 to yes. Likewise, the user either manually starts the browser and navigates the first tab to www.amadeus.com or the user has configured the terminal to automatically start the browser application (e.g., after activation of the terminal) and has configured the browser application to automatically navigate to www.amadeus.com so that no manual activity is required to set the value of the fourth environmental factor with identifier=4 to yes.

Thus, the authentication procedure allows creating a customized password based on environmental factors of the terminal without requiring the user to remember the password. Rather, the user only sets a number of environmental factors constituting the current environmental authentication information into the correct respective state, while some of the environmental factors constituting the current environmental authentication information will be automatically set into the correct respective state by the terminal's system configuration. The environmental password generated at registration time can replace a classic password of a string of characters set by the user. The classic user password may also be maintained as one of the environmental factors. The authentication approach also allows a strong authentication with a diversity of environmental factors and without using external devices. The authentication is also a one-step authentication regardless of the number of environmental factors.

Figure 4:
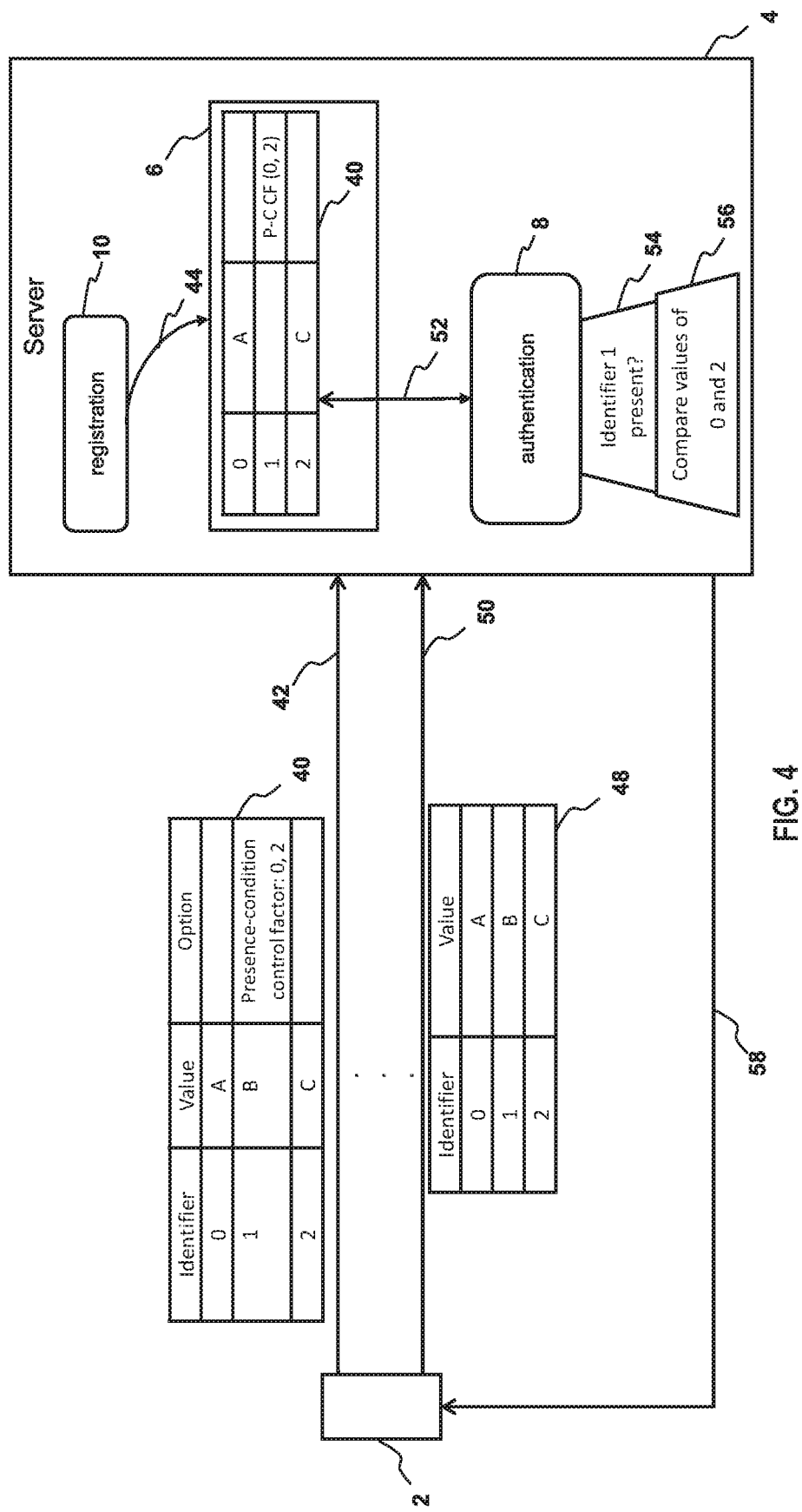
FIGS. 4 and 5 relate to two variants of environmental control factors.
Figure 5:
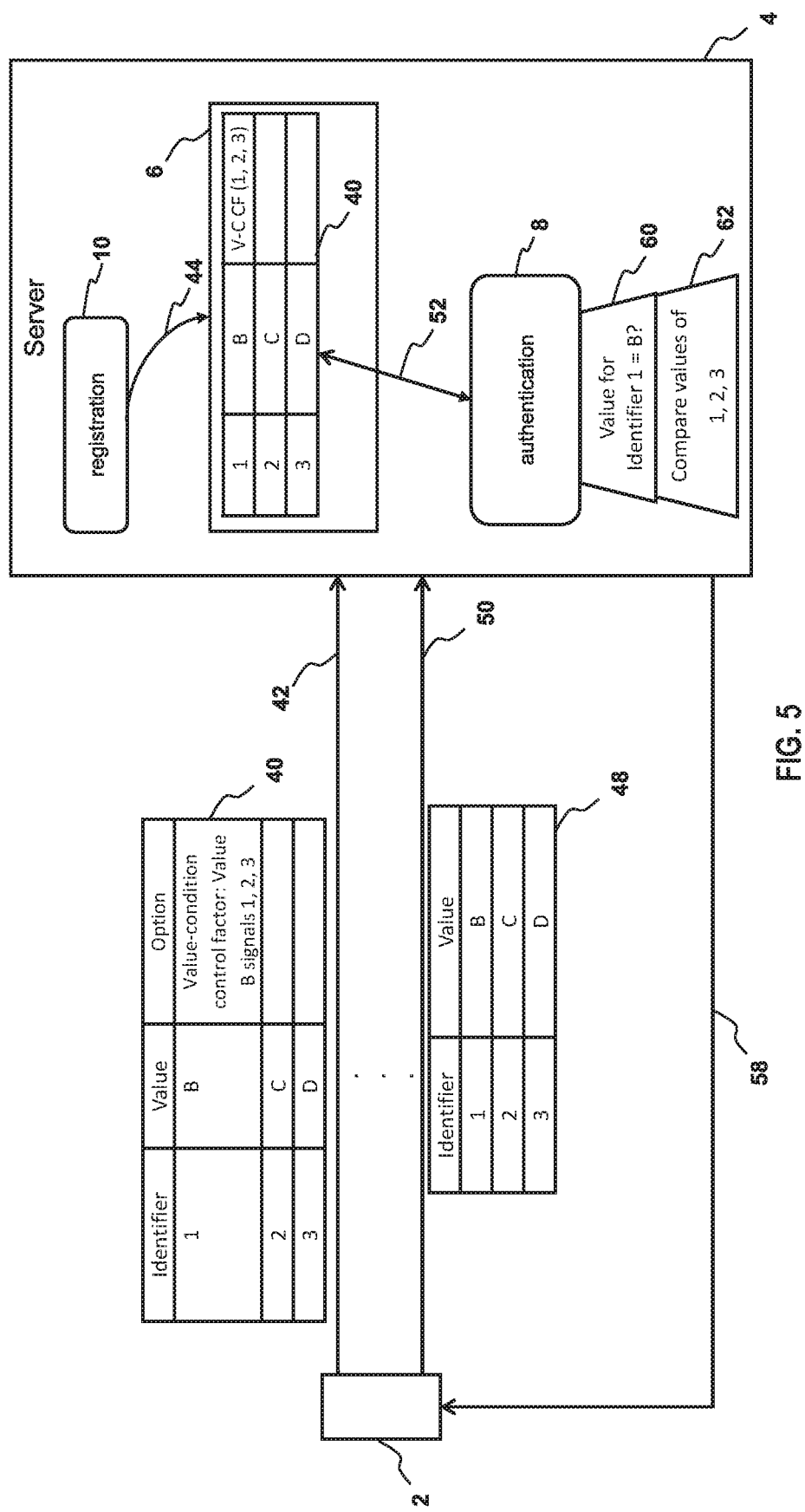

Control Environmental Factors (FIGS. 4 and 5)

The present password generation, registration and authentication approach facilitate the possibility for the user to have different passwords, for example to be able to authenticate from different environments or user devices such as a mobile phone, a personal computer, and a laptop or tablet computer. Each of these different user devices associated to one and the same user will usually have different configuration features. As a consequence, the environmental factors to be included in the environmental password and the current states of the environmental factors may vary across these different user devices. Therefore, the present approach includes a mechanism to generate and register a bundle of passwords including different environmental factors relating to the different user devices. More specifically, one or more of the environmental factors wherein are defined as a control factor when registering the registration environmental authentication information. The at least one control factor determines conditions for applying other environmental factors of the multiple environmental factors when authenticating the terminal with the server. In other words, at least one control factor controls which of the other registered environmental factors are actually be used for authenticating the terminal.

Different variants are envisaged to implement the control function of a control environmental factor. In some embodiments, the one or more control factors is a control factor by identifier meaning that already the presence of the control factor in the environmental authentication information indicates to the server to use a given subset of all the environmental factors registered to authenticate the terminal (FIG. 4). Hence, in these embodiments, the at least one control factor is defined as a presence-condition factor when registering the registration environmental authentication information, wherein an absence or a presence of the presence-condition factor in the current environmental authentication information determines which environmental factors of the multiple environmental factors form the plurality of the multiple environmental factors when authenticating the terminal with the server, i.e., the values of which environmental factors of the (potentially more) registered environmental factors for the user and/or terminal are to be compared in order to authenticate the terminal.

In other embodiments, the one or more control factors is a control factor by value meaning that not the mere presence of the control factor in the environmental authentication information, but the value of the control factor indicates to the server to use a given subset of all the environmental factors registered to authenticate the terminal (FIG. 5). Hence, in these embodiments, the at least one control factor is defined as a value-condition factor when registering the registration environmental authentication information, wherein the value of the value-condition factor included in the current environmental authentication information determines which environmental factors of the multiple environmental factors form the plurality of the multiple environmental factors when authenticating the terminal with the server.

In order to implement the concept of control environmental factors, the above-mentioned definition of the environmental factor is enlarged by a further third parameter in these embodiments, such as an option or control field which indicates whether or not an environmental factor is a control factor and, if affirmative, whether it is a presence-condition factor or a value-condition factor.

When the user and/or the terminal chooses the environmental factors in the registration phase, one or some of the chosen environmental factors are defined to be control factors. The registration environmental authentication information 40 sent from the terminal 2 to the server 4 (registration request 42 in FIGS. 4 and 5) includes the indication which environmental factors are control factors and, if applicable, whether they a control factor is a presence-condition factor (FIG. 4) or a value-condition factor (FIG. 5). The registration environmental authentication information 40 further includes an indication which of the environmental factors constitute the subset forming the environmental authentication information, e.g. the presence of control factor 1 in the environmental authentication information 48 signals that environmental factors 0 and 2, but not 3 form the environmental password for authenticating the terminal.

The server 4, more specifically registration module 10, then stores 44 the received registration environmental authentication information 40 in the database 6 and associates the control factors with the respective environmental factors. If the at least one control factor is defined as a presence-condition control factor (FIG. 4: "P-C CF"), only the identifier of the presence-condition factor is stored at the server 4, but not its value. If the at least one control factor is defined as a value-condition factor (FIG. 5: "V-C CF"), the server stores both identifier and value of the control factor. In some embodiments, the control factor data is stored in a dedicated table of the database 6.

The authentication phase includes the server 4 determining 52 whether one or more value-condition control factors have been registered for the user (FIG. 5). If affirmative, this at least one control factor included in the environmental authentication information 48 received from the terminal 2 is processed first and the server 4, more specifically authentication module 8, compares 60 the value of the at least one value-condition control factor to the value of the registered value-condition control factor. If both values are substantially identical, the server 4 continues with the authentication process by comparing 62 the values of all the environmental factors of the environmental authentication information identified by the value of the value-condition control factor with the values of the corresponding registered environmental factors. The server 4 then returns a positive or negative authentication response 58 to the terminal.

If the server 4 determines that no value of a registered value-condition control factor is equal to the corresponding values of the environmental factors included in the environmental authentication information received from the terminal, the server 4 considers the user as not registered in this particular terminal environment. The server 4 denies authentication of the user and terminal by returning a rejection response 58. Optionally, the server 4 asks the user to register a new environmental password for this terminal environment and e.g. to confirm the new environmental password with an external factor (another terminal for which another environmental authentication information including one or more control factors has already been registered).

If the registered environmental authentication information 48 includes a presence-condition control factor (FIG. 4) for the user, the server verifies 54 the presence of this environmental factor (i.e., its identifier irrespective of its value) in the environmental authentication information received from the terminal, and if affirmative, authenticates the terminal on the basis of the environmental password (i.e. the subset of environmental factors) associated with the one or more presence-condition control factors. As described above, the server 4 compares 56 the values of the environmental factors prescribed by the presence of the at least one presence-condition control factor and returns a positive or negative authentication response 58 to the terminal.

To further facilitate understanding of the concept of presence-condition and value-condition control factors, the following non-limiting example is given using five environmental factors:

| Environmental factor | Identifier | Value |
|---|---|---|
| MS Outlook ® installed | 0 | |
| mobile app "AeTM" installed | 1 | |
| WWW domain of the first tab in the browser application | 2 | |
| screen luminosity | 3 | |
| volume | 4 | |

Note that the different passwords for different terminal devices are composed by different factors in the present example, but different passwords can also be composed by the same factors with different values.

Assume that the user already has registered a default environmental authentication information including the two environmental factors volume (identifier 4) and domain of first browser tab (2) set to specific values. The user possesses a computer and a smartphone. In his computer, the user registers a new environmental authentication information composed by MS Outlook® installed (0), domain of the first tab (2) and screen luminosity (3) and specifies MS Outlook® installed as a presence-condition control factor because MS Outlook® is only installed on the computer, but not on the smartphone. In his smartphone, he registers another environmental authentication information composed by the environmental factors "AeTM" mobile app installed (1), screen luminosity (3) and volume (4) and sets "AeTM" mobile app installed as presence-condition control factor as "AeTM" mobile app is only present on the smartphone, but not on the computer. Registrations of the two additional passwords are only successful after the user has successfully authenticated himself based on the default environmental authentication information.

Thus, the user has registered three environmental passwords, such as:

Default password:

| Environmental factor | Identifier | Value | Option |
|---|---|---|---|
| WWW domain of the first tab in the browser application | 2 | www.amadeus.com | |
| volume | 4 | 23 | |

Computer password:

| Environmental factor | Identifier | Value | Option |
|---|---|---|---|
| MS Outlook ® installed | 0 | yes | presence-condition control factor |
| WWW domain of the first tab in the browser application | 2 | www.amadeus.com | |
| screen luminosity | 3 | 50 | |

Smartphone password:

| Environmental factor | Identifier | Value | Option |
|---|---|---|---|
| mobile app "AeTM" installed | 1 | yes | presence-condition control factor |
| screen luminosity | 3 | 50 | |
| volume | 4 | 12 | |

When user logs in during the authentication phase, the server checks the presence of the identifier MS Outlook® installed (0) in the environmental authentication information received from the terminal. If the identifier 0 is found in the authentication information, the server determines the values of the three environmental factors MS Outlook® installed (0), domain of the first tab (2) and screen luminosity (3) for the authentication process. If the server determines that the identifier 0 is not present in the environmental authentication information, but identifier 1 "AeTM" mobile app installed is present in the environmental authentication information, the server determines the values of the three environmental factors "AeTM" mobile app installed (1), screen luminosity (3) and volume (4) for the authentication process. If the server does neither detect identifier 0 nor identifier 1 in the environmental authentication information, the default environmental password using volume (4) and domain of first browser tab (2) is checked.

In a variation of this example, the user has two computers, a private computer and a professional computer. He registers a different new environmental password with and for his private computer which is composed by three environmental factors MS Outlook® installed (0), domain of first browser tab (2) and screen luminosity (3), wherein he specifies the domain of first browser tab (2) factor set to value "XXX.fr" as a value-conditional control factor. With and for his professional computer, he registers another environmental password composed by three environmental factors MS Outlook® installed (0), domain of first browser tab (2) and volume (4). Again, the user sets the domain of first browser tab (2) factor as a value-conditional control factor, but now set to value "YYY.com" in order to signal authentication for the professional computer. Hence, the user again has registered three environmental passwords, such as:

Default password:

| Environmental factor | Identifier | Value | Option |
|---|---|---|---|
| WWW domain of the first tab in the browser application | 2 | www.amadeus.com | |
| volume | 4 | 23 | |

Personal computer password:

| Environmental factor | Identifier | Value | Option |
|---|---|---|---|
| MS Outlook ® installed | 0 | yes | |
| WWW domain of the first tab in the browser application | 2 | XXX.fr | value-condition control factor |
| screen luminosity | 3 | 50 | |

Professional computer password:

| Environmental factor | Identifier | Value | Option |
|---|---|---|---|
| MS Outlook ® installed | 0 | yes | |
| WWW domain of the first tab in the browser application | 2 | XXX.fr | value-condition control factor |
| volume | 4 | 23 | |

During the authentication phase, the user logs in either from his personal computer or from his professional computer. The server first checks the value of the value-conditional control factor, domain of first browser tab (2). If the value of the domain of first browser tab (2) is "XXX.fr", the server compares the values of the three environmental factors MS Outlook® installed (0), domain of the first tab (2) and screen luminosity (3) included in the environmental authentication information with the respective values previously registered during the registration phase. On the other hand, if the value of the domain of first browser tab (2) is "YYY.com", the server compares the values of the three environmental factors MS Outlook® installed (0), domain of the first tab (2) and volume (4) included in the authentication information with the respective values previously registered during the registration phase. If the value of the domain of first browser tab (2) is different from "XXX.fr" and "YYY.com", the server uses the default environmental password of the user.

Figure 6:
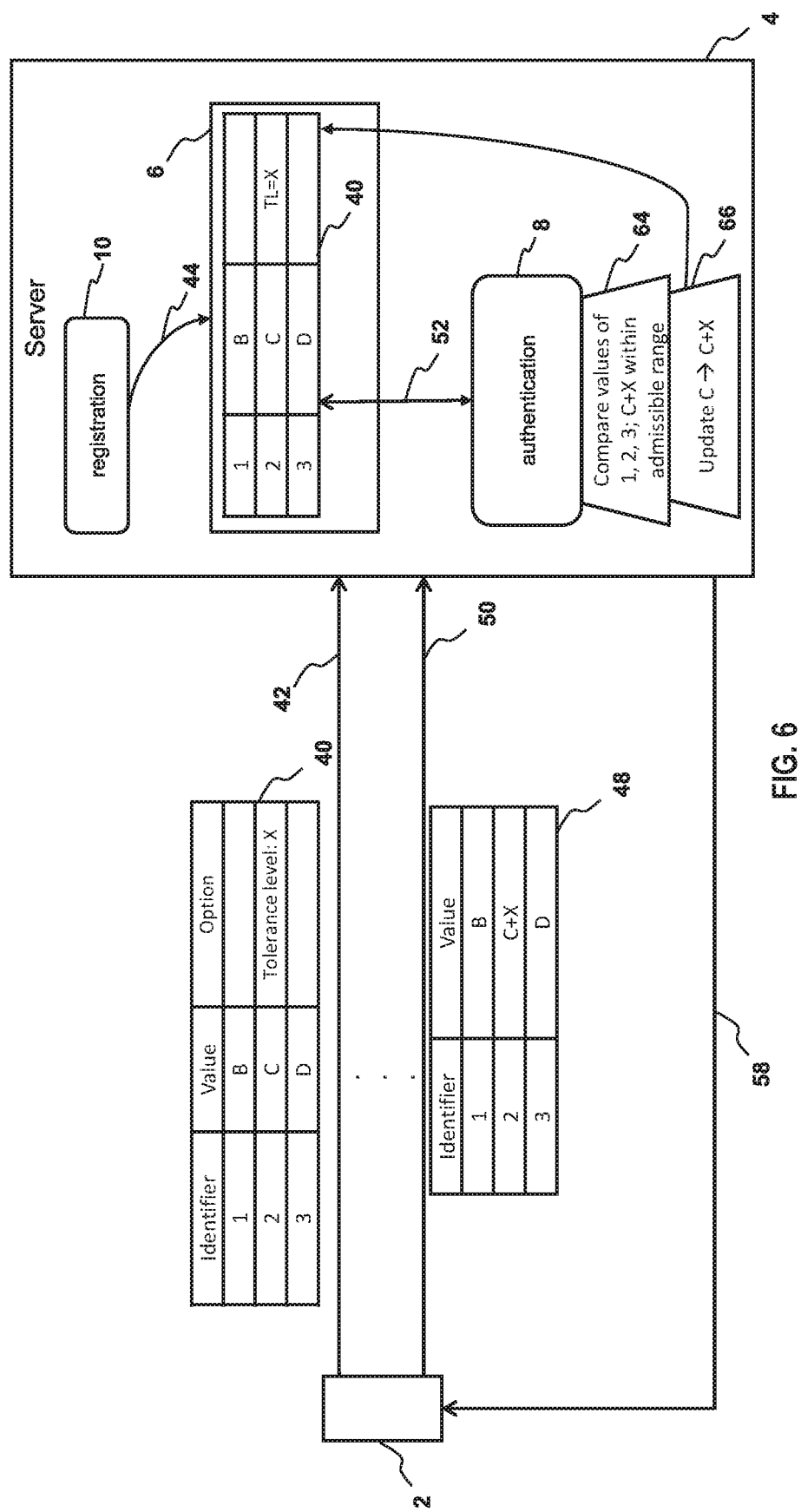
FIGS. 6, 7, and 8 relate to three variants of a progressive environmental password.
Figure 7:
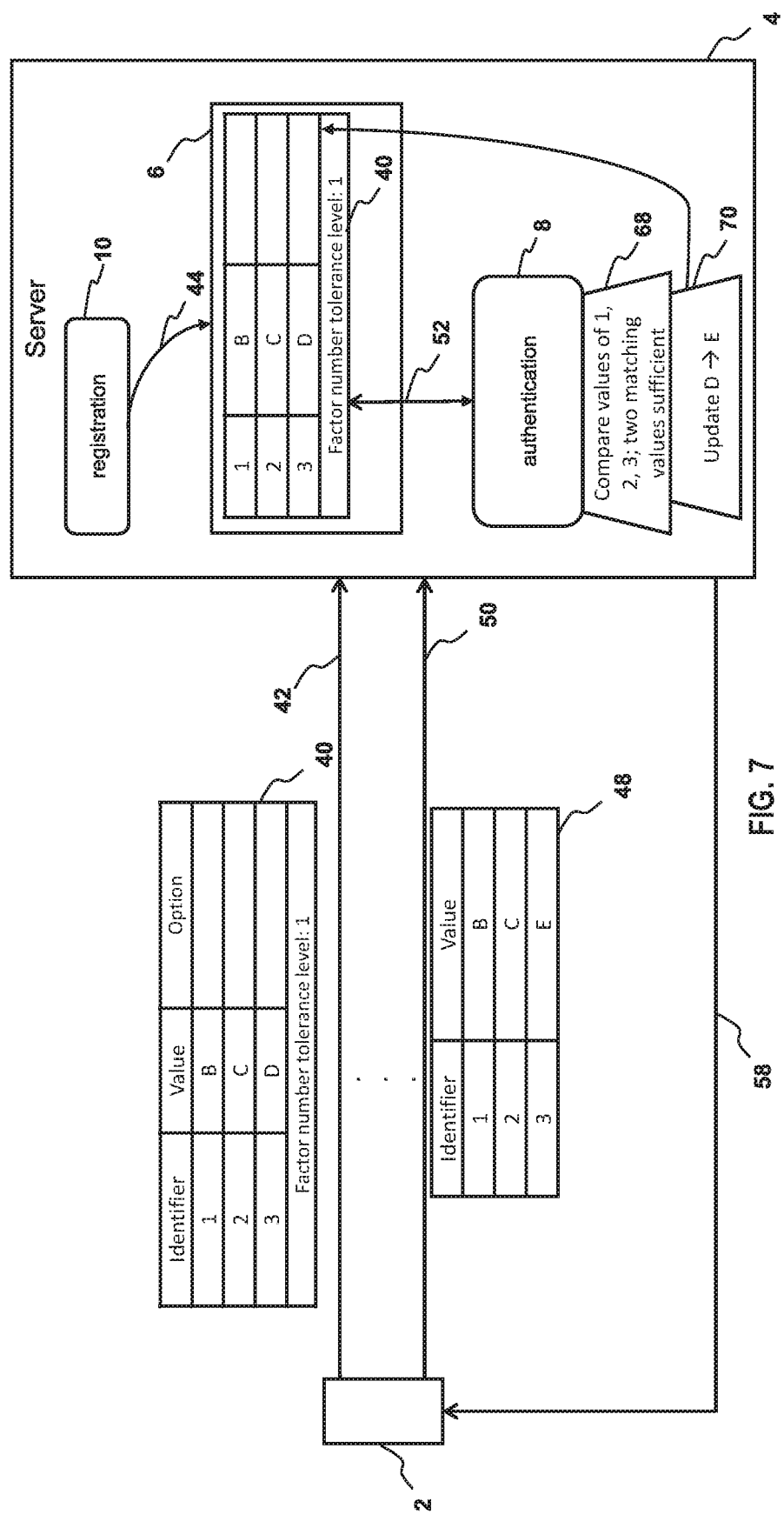

Progressive Environmental Password (FIGS. 6 and 7)

In some embodiments and for some implementations, registered environmental authentication information may be updated automatically throughout their lifetime depending changing states of the characteristics of the user terminal. This automatic update is also referred to as a progressive password. In general term, a progressive environmental password is an environmental authentication information that can be adapted to changing values of the environmental factors of the terminal of which the environmental authentication information is composed. As already described above, the values of the environmental factors of the terminal are not static, but may vary either depending on automatic reconfigurations of the terminal (e.g. due to software updates) or influenced by a new behavior of the user.

To this end, in some embodiments, at least one of the multiple environmental factors is additionally defined by a tolerance level defining a range of admissible values of the at least one environmental factor within which the terminal is successfully authenticated (FIG. 6). As long as the value of an environmental factor is within the range defined by the tolerance level during authentication, it is considered to be substantially identical with the registered value.

A generic example is given by FIG. 6 according to which the environmental factor with identifier 2 and value C is supplemented by tolerance level X meaning that the server 4 considers all values within the range C−X to C+X to be identical with the registered value C during comparison 64. The server also stores values deviating from C being within the admissible range. If e.g. the terminal 2 has been successfully authenticated three times with value C+X, value C is updated 66 to value C+X.

With reference to one of the previous examples given below, a tolerance level may be defined for the number of files in a particular folder:

| Environmental factor | Identifier | Value | Option |
|---|---|---|---|
| operating system | 0 | MS Windows ® 10 | |
| number of files in folder C:\Users\User\Desktop | 1 | 12 | Tolerance level: 3 |
| USB flash drive inserted in USB slot | 2 | yes | |
| Browser application executed with first tab set to www.amadeus.com | 3 | yes | |

Hence, in this example, the environmental factor "number of files in folder C:\Users\User\Desktop" was originally registered with the value of 12. However, at registration, the user (or the system automatically) also set a tolerance level of 3. The tolerance level thus forms a part of the registration environmental authentication information 40 and is stored by the server 4 during the registration phase in the database 6. In the authentication phase, the server successfully authenticates the terminal if the number of files in this folder is in the range between 9 to 15.

Automatic adaption of the environmental password is then implemented in the embodiments by updating the value of the at least one environmental factor included in the stored registration environmental authentication information with the value of the at least one environmental factor included in the current environmental authentication information in response to determining that the value of the at least one environmental factor included in the current environmental authentication information is within the range of admissible values defined by the tolerance level, but not identical to the value of the at least one environmental factor included in the stored registration environmental authentication information.

In the given example, the server stores the values of the environmental factor "number of files in folder C:\Users\User\Desktop" in the current environmental authentication information of previous authentications and thus forms a history of past authentication values. If the value deviates from the registered value (12 in the example) for a given number of times, but stays within the admissible range set by the tolerance level, the server then updates the registered value. For example, the user may have stored three additional files on his desktop of his terminal and the number of files thus has increased from 12 to 15. After having authenticated the terminal three times with a value of 15 for the environmental factor "number of files in folder C:\Users\User\Desktop", the server—having tracked the value history—automatically updates the registration environmental authentication information by changing the value of the factor "number of files in folder C:\Users\User\Desktop" from 12 to 15. The tolerance level may remain unchanged, i.e. the terminal is successfully authenticated from that point on as long as the factor "number of files in folder C:\Users\User\Desktop" has a value within the range of 12 to 18.

In the same or other embodiments, a tolerance level may (also) be defined at the level of numbers of environmental factors that have to be successfully matched during authentication (FIG. 7). This environmental factor number tolerance level is included in the registration environmental authentication information 40 and stored 44 by the server 4.

Authentication of the terminal 2 is successful if the values of a number of environmental factors within the current environmental authentication information 48 are substantially identical with the values of the registration environmental authentication information 40. For example, an environmental password registered may be composed of 20 environmental factors with an environmental factor number tolerance level set to 3 meaning that at least 17 environmental factors out of the 20 registered factors have to match for successful authentication during the authentication phase. The tolerance level may also indicate the absolute minimum number of environmental factors that have to be substantially identical for successful authentication (in this example: 17).

In the more simplified example of FIG. 7, the factor number tolerance level is set to 1 meaning that only two of the three environmental factors identified by identifiers 1, 2, 3 need to match in order to successfully authenticate the terminal 2. Hence, in response to receiving authentication request 50, the server 4 compares 68 the values of all three environmental factors and recognizes matching values for the two environmental factors 1 and 2, while the value of environmental factor 3 does not match (D≠E).

The values of non-matching environmental factors are stored by the server in the course of a successful authentication procedure. For example, if the values of two of the 20 environmental factors are not substantially identical with the respective registered values, these two values are stored by the server. If the server determines after a certain number of successful authentications that the values of these mismatching environmental factors have been changed (e.g. the values of these mismatching environmental factors remain to be different from the registered values at a certain other value for a number of successful authentications), the server automatically updates the values of the continuing mismatching environmental factors to the new values received from the terminal during the last successful authentications.

In the simplified example of FIG. 7, if e.g. the terminal 2 has been successfully authenticated three times with value E for environmental factor 3, value D is updated 70 to value E. As a further more specific example, the user may have reset the start page of the web browser application on his terminal from www.amadeus.com to http://www.amadeus.com/blog/ and may have updated the operating system of the terminal from Windows® 8 to Windows® 10, while the values of the other 18 environmental factors of the terminal are still identical to the respective registered values. After having successfully authenticated the terminal with the two new values http://www.amadeus.com/blog/ and Windows® 10 (which are tracked by the server), the server automatically updates the two registered values of these two environmental factors to the new values.

Figure 8:
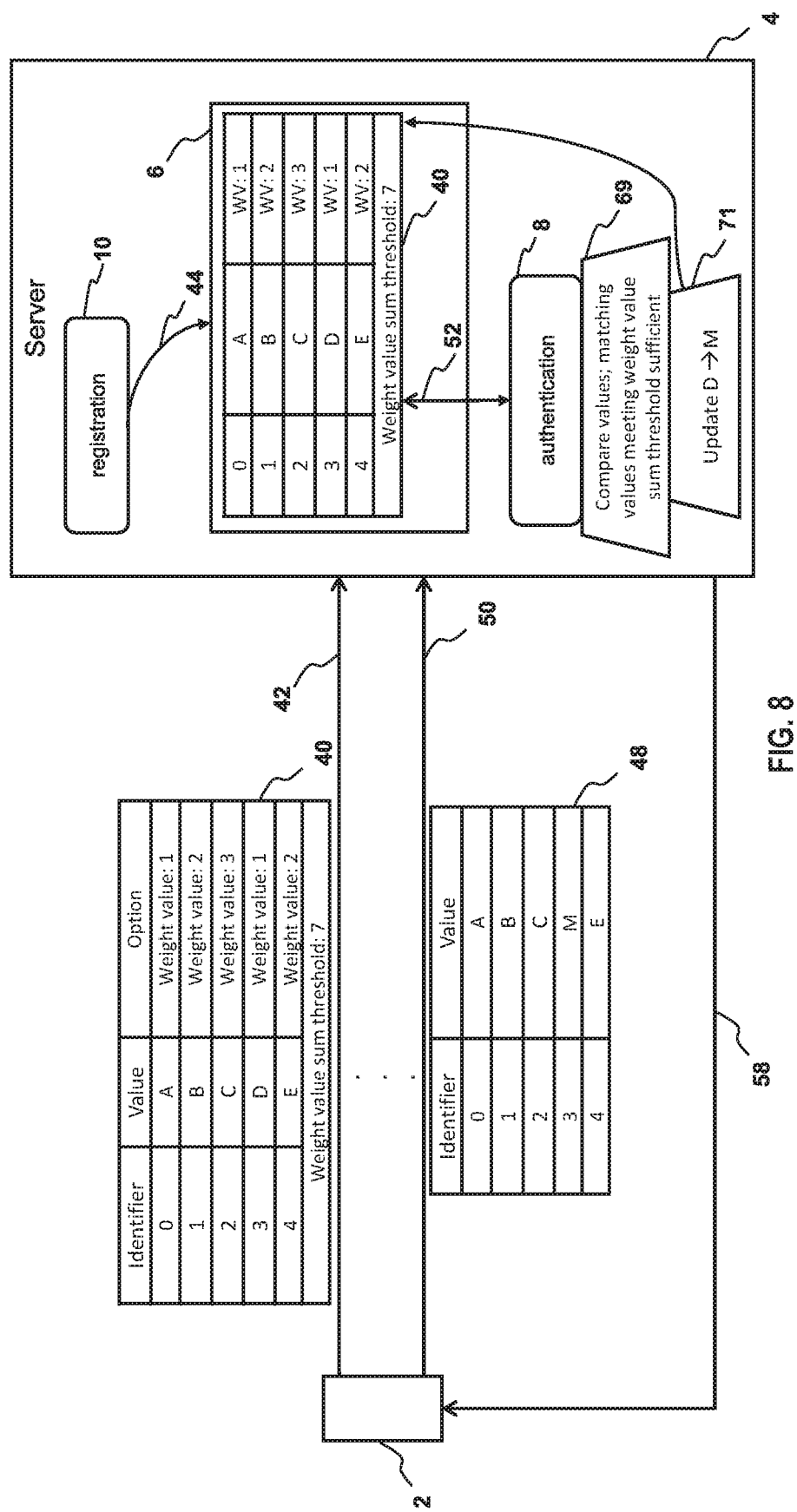

A further refined implementation option of a progressive environmental password utilizes weight values (FIG. 8). In these embodiments, which may be employed in addition or alternative to the examples of FIG. 6 and FIG. 7, each environmental factor is associated with a weight value and a weight value sum threshold may be set. The weight values of the individual environmental factors and the weight value sum threshold are included in the registration environmental authentication information 40 and stored 44 by the server 4. Authentication of the terminal 2 is successful if the sum of the weight values of environmental factors within the current environmental authentication information 48 which are substantially identical with the values of the registration environmental authentication information 40 is at or above the weight value sum threshold.

In the simplified example of FIG. 8, the registration environmental authentication information 40 includes five environmental factors, two having a weight value of 1, two having a weight value of 2 and one having a weight value of 3. The weight value sum threshold is set to 7 meaning that either the values of the environmental factors with identifiers 1, 2 and 4 or the environmental factors with identifiers 0, 2 and 3 and either 1 or 4 need to match in order to successfully authenticate the terminal 2. Hence, in response to receiving authentication request 50, the server 4 compares 69 the values of all five environmental factors and recognizes matching values for all environmental factors except environmental factor 3 (D≠M). The server 4 then calculates 69 the weight value sum of the four matching environmental factors (8) and compares 69 the calculated weight value sum with the weight value sum threshold of the registration environmental authentication information 40 (7). In response to determining 69 that the calculated weight value sum is at or above the weight value sum threshold of the registration environmental authentication information, the server 4 authenticates 58 the terminal 2. If the calculated weight value sum is below the weight value sum threshold of the registration environmental authentication information, authentication is rejected.

Similar to the previous examples of FIGS. 6 and 7, the values of non-matching environmental factors are stored by the server in the course of a successful authentication procedure. Hence, in the simplified example of FIG. 8, if e.g. the terminal 2 has been successfully authenticated three times with value M for environmental factor 3, value D is updated 71 to value M.

Hence, the progressive environmental password is a password that changes over time with user behavior and/or terminal reconfiguration within some well-defined limits.

In some embodiments implementing the concept of the progressive environmental password, a password profile is generated reflecting the changes in user behavior and/or terminal configuration over time and automatically establishes or fine-tunes tolerance level. A password profile is an accumulation of non-hashed data sent from the terminal to the server during authentications and thus represents the history of matching and non-matching environmental factor values of past authentications. A password profile is thus created by collecting past environmental authentication information and evaluating non-matching environmental factor and their values that are within the value margins set by the tolerance levels. The profile is generated using machine learning algorithms and updated following long-term user behavior and terminal configuration changes.

Password Policy

In some embodiments, the password generation described herein is supported by a password policy. The password policy predefines a minimum number of environmental factors and/or specific environmental factors that are to be mandatorily included into the registration environmental authentication information and/or acceptable values for the environmental factors including optional tolerance levels for the values and/or weight values associated with the environmental factors. For example, a password policy is sensible for organization such as companies in order to ensure a certain minimum security level across all the environmental passwords registered for the users and devices of the organization.

The password policy may be implemented by using data records that are stored at a server database and that store the control data defining the password policy. Client software implementing the registration process at the terminal retrieves the password policy from the server database and forces the user to select the environmental factors and potentially configure the terminal with the values of the environmental factors prescribed by the password policy.

Implementation Variants

The mechanisms to register an environmental password and authenticate a terminal on the basis of the registered environmental password can be implemented various ways. Four possible implementation variants including different manners to store the environmental authentication information at the server with different options to support control factors and/or progressive passwords will be described next with reference to FIGS. 9-12.

First Embodiment: Merged Authentication Information (FIG. 9)

According to the first implementation embodiment, the server merges the values of all registered environmental factors. Hence, the registered environmental authentication information includes all identifiers of the individual environmental factors and a single value string resulting from the merging of the values of the individual environmental factors. Optionally, the value string is hashed by the server and thus stored as a hash value which is linked to the user and/or terminal. Merging of the values of the individual environmental factors is based on a defined order of the identifiers, i.e. the identifiers serve as indexes for the individual environmental factors.

Figure 9:
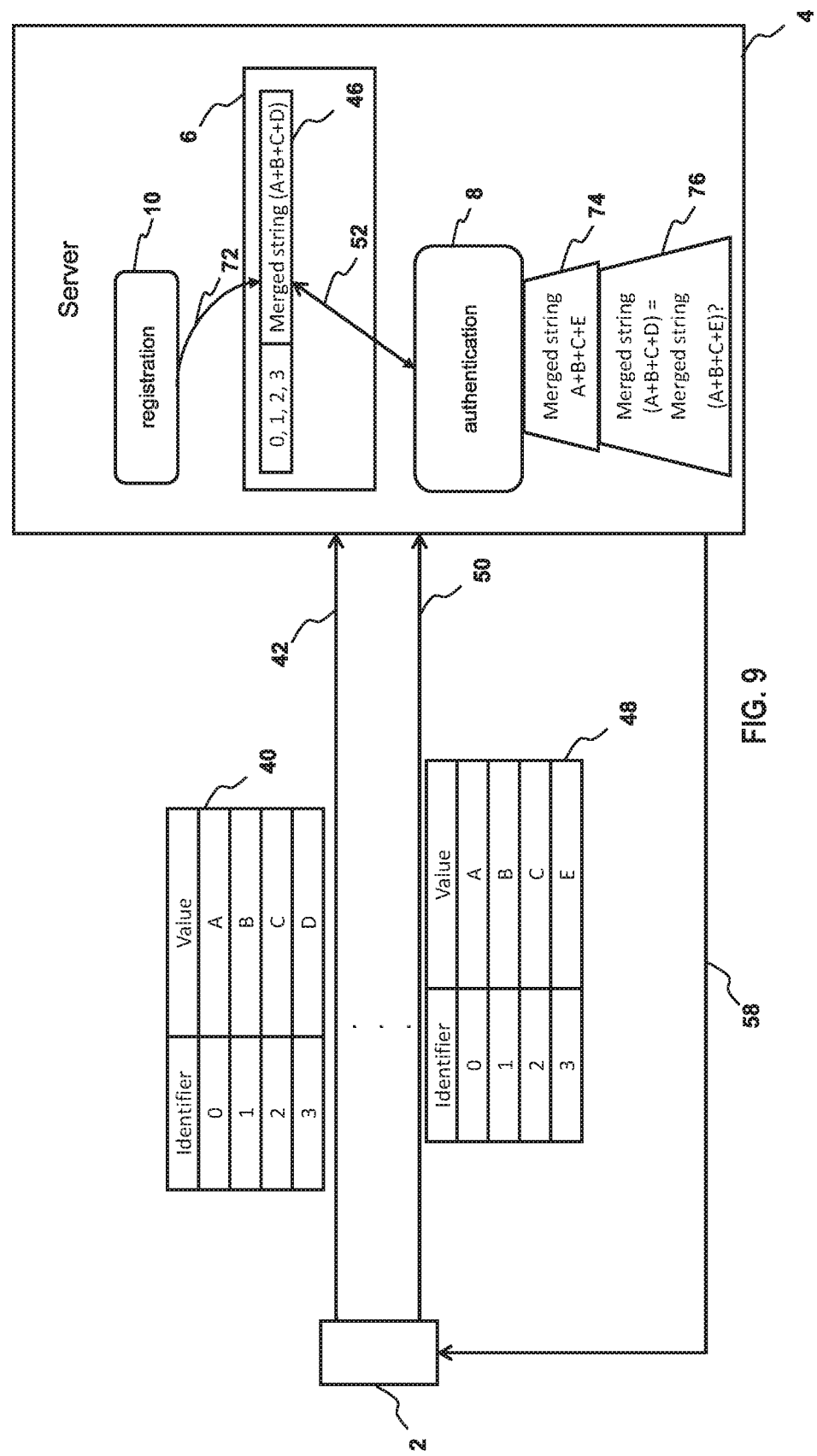
FIG. 9 visualizes an implementation embodiment for registering an environmental password and authenticating a terminal.

A registration procedure and an authentication procedure according to the first implementation embodiment is shown by FIG. 9. After having established the registration environmental authentication information 40 in the manner described above, the terminal 2 sends the registration environmental authentication information 40 to the server 4 by registration request 42. Registration request 42 may indicate the tuples of identifier and value of each environmental factor as an indexed list schema. Registration request 42 also indicates that this message is a request to register an environmental password and also indicates the user and/or terminal such as a user ID or terminal ID to which the registration refers. In response to receiving the registration environmental authentication information 40, the server 4, more specifically the registration module 10, merges the received registration environmental authentication information 40 to form a discrete registration authentication string. For example, merging is done by concatenating all values in accordance with the order given by the identifiers of the individual environmental factors indicated in the registration request 42 and subsequently performing a hash function over the concatenated string. In the example of FIG. 9, the four environmental factors given by identifiers 0, 1, 2 and 3 and respective values A, B, C, D are transformed to a single data record 46 given by the set of ordered identifiers 0, 1, 2 and 3 as well as the merged discrete string A+B+C+D. The server 4 stores the resulting registration environmental authentication information 46 including the discrete registration authentication string in the database 6 (both activities of merging and storing are indicated by arrow 44 in FIG. 9). Storing includes linking the discrete registration authentication string to the terminal ID and/or user ID as well the list of identifiers received by registration request 42.

At authentication time, the terminal generates the current environmental authentication information 48. In the example of FIG. 9, the value of the fourth environmental factor identified by identifier 3 has a value (E) deviating from the registered value D. The terminal 2 sends the current environmental authentication information to the server by authentication request 50. In response to receiving the current environmental authentication information, the server 4, more specifically the authentication module 8, again merges 74 the received current environmental authentication information 48 using the same merging algorithm as in the registration phase to form a current discrete authentication string. In the example of FIG. 4, based on the ordered identifiers 0, 1, 2 and 3, the authentication module 8 generates 54 merged string A+B+C+E, retrieves 52 the registration environmental authentication information 46, more specifically registered merged string A+B+C+D, from the database 6, and compares 76 the current discrete authentication string A+B+C+E with the stored discrete registration authentication string A+B+C+D. In response to determining that the current discrete authentication string is identical to the stored discrete registration string, the server 4 authenticates the terminal 2. In the example of FIG. 8, authentication is unsuccessful as the two discrete authentication strings are not identical and server 4 returns a rejection message 58 indicating rejecting of the authentication request 50.

The first implementation embodiment has the technical advantage of being a simple procedure as authentication is similar to an authentication request based on a traditional password where also two discrete string are compared to each other. The main difference to a classic authentication process is the list of identifiers serving as indexes is stored by the server in order to facilitate merging the values of the individual environmental factors during authentication. The first implementation embodiment also requires less storage space in the server, compared to the other three implementation examples described below.

Second Implementation Embodiment (FIG. 10): Separate Hashed Values

Different from the first implementation example, the values of the environmental factors are not merged, but kept and stored separately in the second implementation embodiment, each value linked to the respective identifier and the whole set of environmental factors linked to a user ID and/or terminal ID. Hence, in response to receiving the registration environmental authentication information 40, the server 4 forms a respective discrete registration authentication string for each individual authentication information includes the received registration environmental authentication information 40 and stores each of the discrete registration authentication strings. More specifically, the server 4 hashes each of the values of registration environmental authentication information 40 received in the registration request 42 and separate hashed values 80 in the database 6 (both activities of hashing and storing are indicated by arrow 78 in FIG. 10). The order of the environmental factors is not important, i.e. the data concerning the environmental factors are processed, stored and organized into a key-value schema, where the identifiers serve as keys for retrieving 52 the hashed values.

Figure 10:
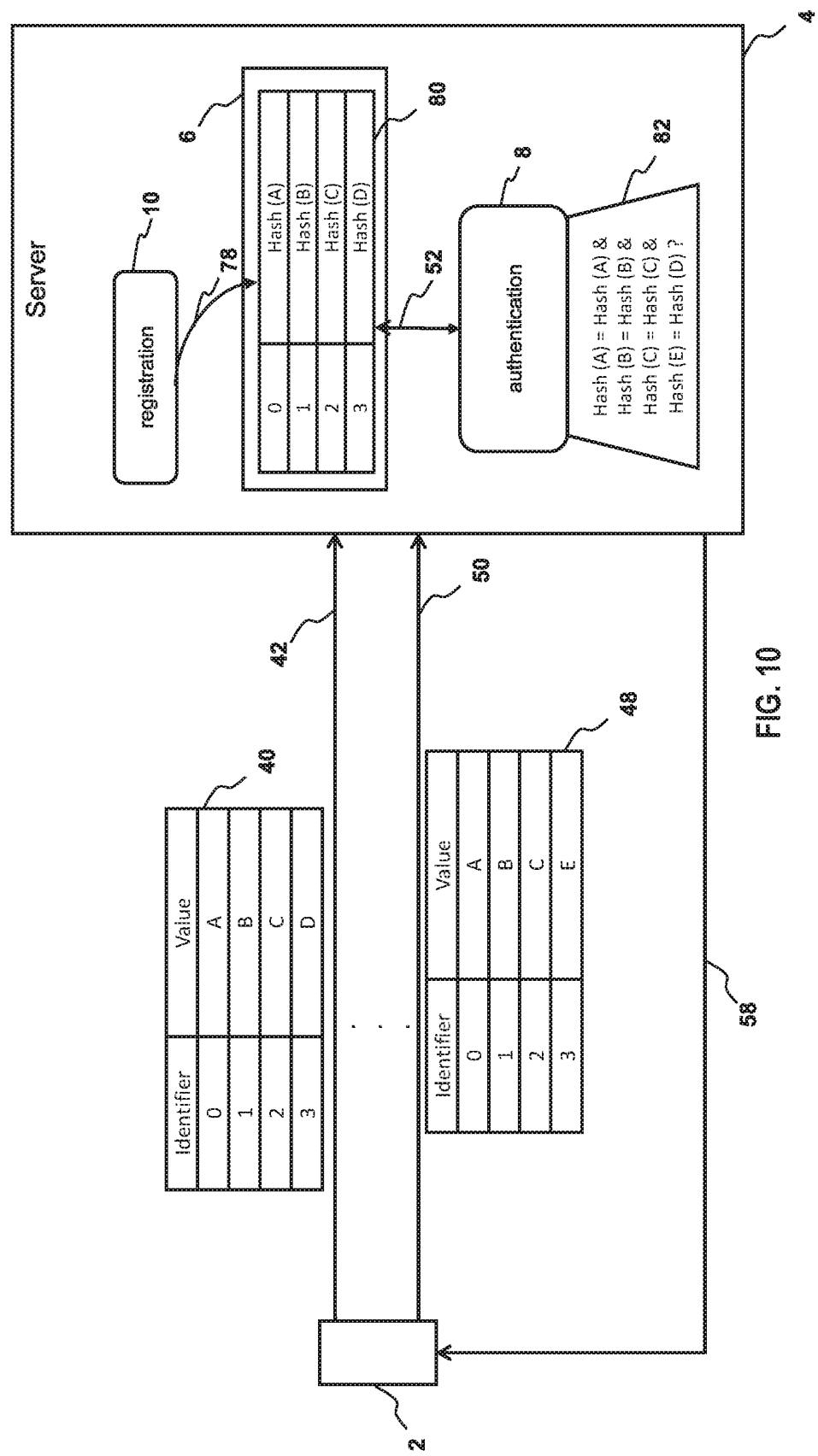
FIG. 10 visualizes another implementation embodiment for registering an environmental password and authenticating a terminal.
Figure 11:
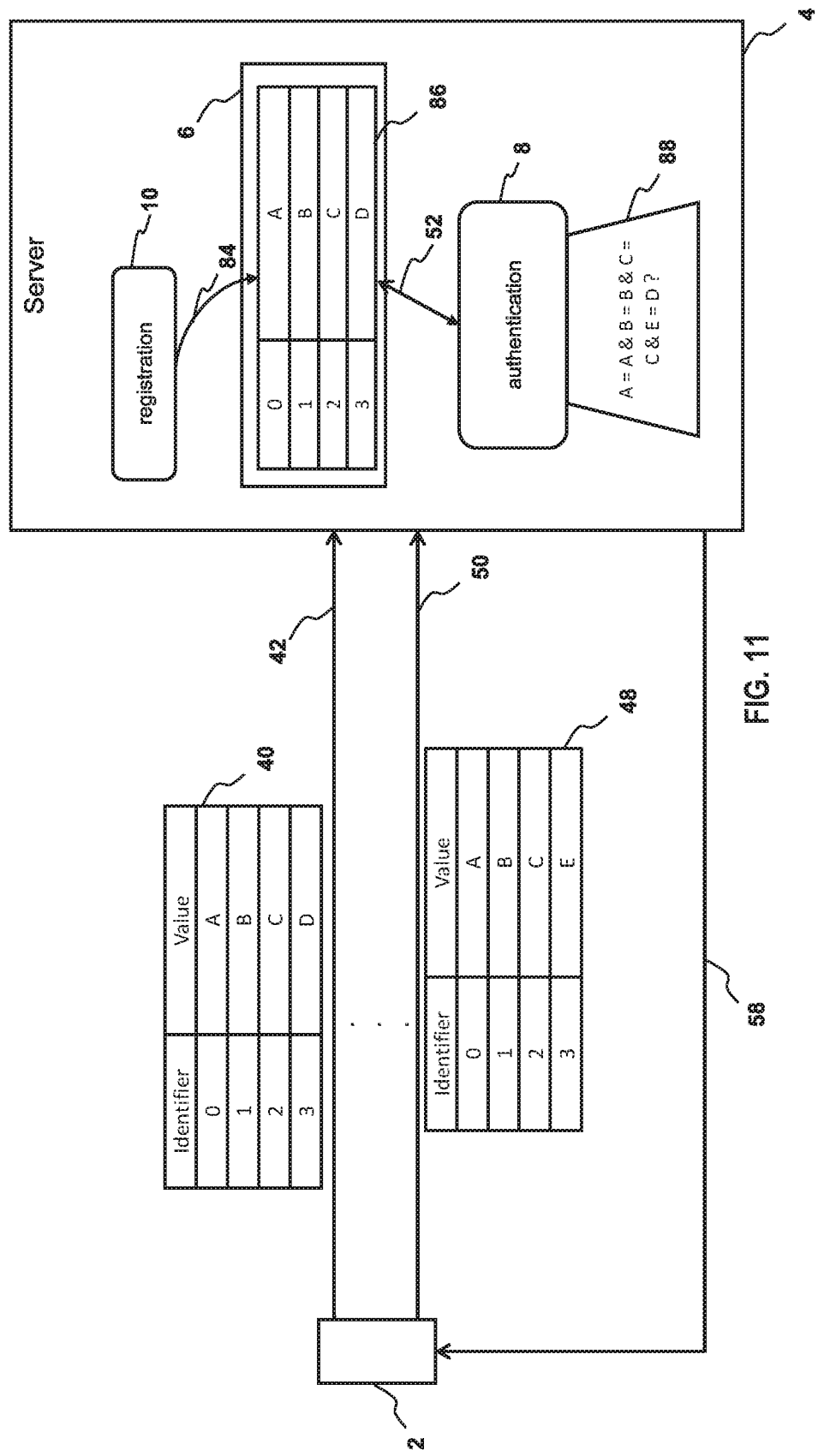
FIG. 11 visualizes another implementation embodiment for registering an environmental password and authenticating a terminal.

During the authentication phase, the terminal 2 sends the current environmental authentication information 48 (at least identifiers and values of the environmental factors) to the server 4 by authentication request 50. In response to receiving the current environmental authentication information, the server 4 again forms a respective discrete current authentication string for each individual authentication information included in the received current environmental authentication information 48 and compares 82 each of the current discrete authentication strings with the corresponding stored discrete registration authentication string. More specifically, the server hashes the received values by the same hashing algorithm employed during registration, retrieves 52 the registered hashed values from the database 6 based on the identifiers received in the current environmental authentication information 48, and compares 82 sets of hashed values. Authentication is successful if all hash value pairs are equal. In the example of FIG. 10, the last hash value pair is not identical, authentication thus fails and the server 4 returns an authentication rejection 58.

Hence, the second implementation embodiment is an implementation which transforms environmental factor values to different individual hashed passwords. The second implementation embodiment also supports presence-condition control factors and value-condition control factors as described above with reference to FIGS. 4 and 5. As the individual environmental factors and their individual hash-values are stored separately at the server's database 6, server 4 is able to determine whether one or more environmental factors are defined as presence-condition control value in the database 6 and whether the defined environmental factors are present in the authentication request 50, as well as whether the value of a value-condition control factor included in the current environmental authentication information 48 is equal to the stored value of the registration environmental authentication information 40. Hence, the second implementation embodiment can be combined with the control factor mechanism of FIGS. 4 and 5.

In addition, the second implementation embodiment supports the progressive password using environmental factor number tolerance level as described above with reference to FIG. 7 and also the progressive password utilizing weight values as described above with reference to FIG. 8. Hence, in response to determining 68 that at least a given number of the current discrete authentication strings is identical to the corresponding stored discrete registration strings in accordance with the environmental factor number tolerance level (FIG. 7) and/or in response to determining 69 that the weight value sum of the matching environmental factors meets the weight value sum threshold (FIG. 8), the server 4 authenticates the terminal 2. If the values of one or more environmental factors mismatch, but authentication is successful, i.e. the number of matching environmental factors are within the admissible range defined by the environmental factor number tolerance level and/or the weight value sum threshold is met, each mismatching hash of the current environmental authentication information 48 is stored as temporary hash value by the server 4 in the database 6. If the temporary hash value is validated during a given number of following authentications, the server 4 updates 70, 71 the old hash value with the new hash value that has been temporary so far.

Third Implementation Embodiment (FIG. 11): Unhashed Strings

The third implementation embodiment (FIG. 11) differs from the second implementation embodiment in that the values of the environmental factors are not hashed which facilitates quantitative comparison 88 of stored value with current authentication values.

Hence, in the registration phase, in response to receiving the registration environmental authentication information 40, the server stores 84 the respective identifier and value of each of the multiple environmental factors included in the registration environmental authentication information 40. Optionally, the values are stored in an encrypted manner in the database 6.

At authentication time, in response to receiving the current environmental authentication information 48, the server compares 88 each of the values of the plurality of the multiple environmental factors included in the current environmental authentication information 48 with the corresponding stored values of the multiple environmental factors included in the registration environmental authentication information 86.

The third implementation embodiment also supports the control factor mechanisms as already described with respect to the second implementation embodiment as described above.

In addition, the second implementation embodiment supports the progressive password using value tolerance levels as described above with reference to FIG. 6 and/or environmental factor number tolerance level as described above with reference to FIG. 7 and/or the weight-value-based approach as described above with reference to FIG. 8. Hence, in response to determining 88 that at least a given number of the respective values of the plurality of the multiple environmental factors included in the current environmental authentication information 48 is substantially identical with the corresponding stored value of the multiple environmental factors included in the registration environmental authentication information 86, the server 4 authenticates the terminal 2.

Figure 12:
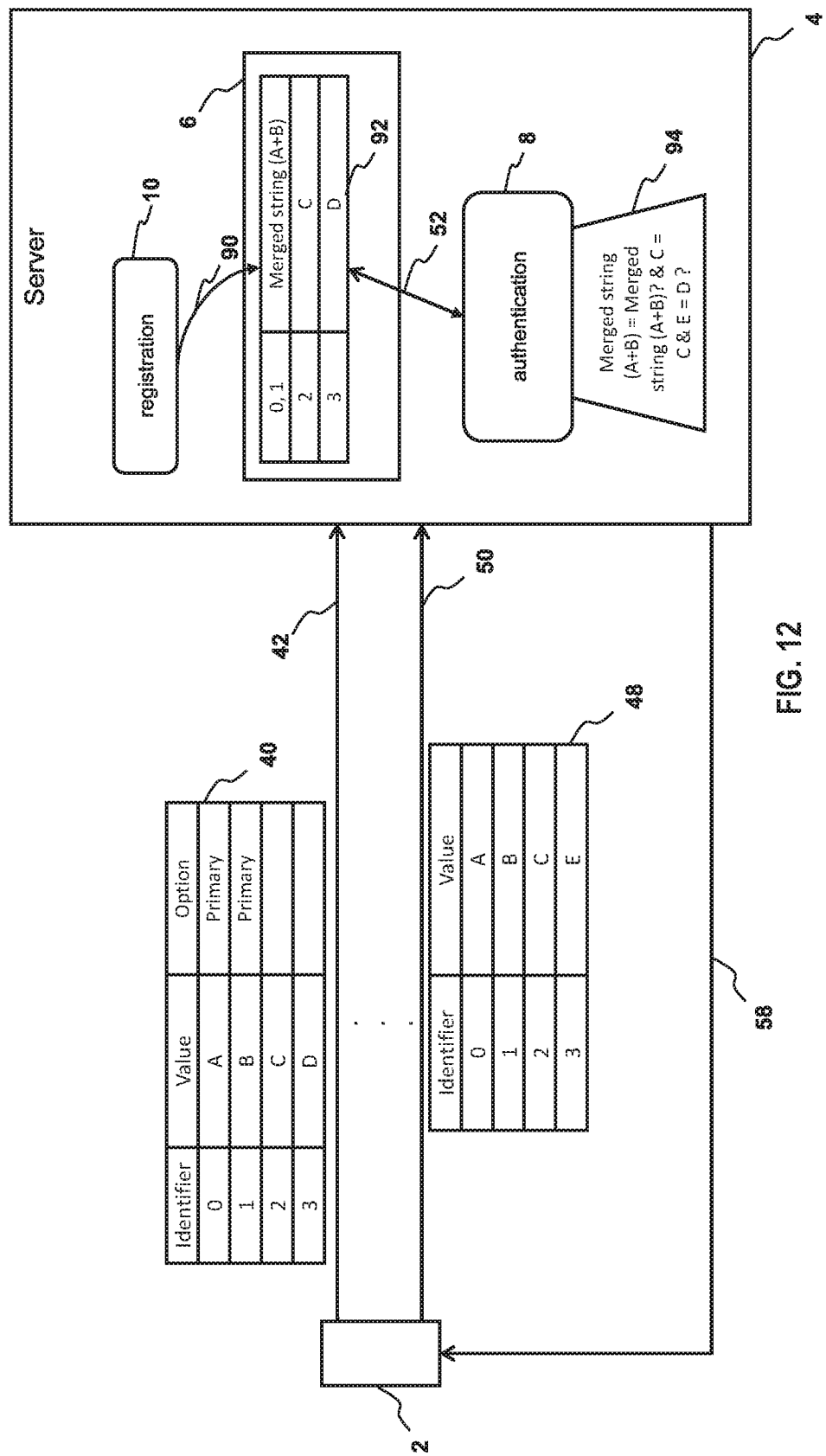
FIGS. 12 and 13 visualize another implementation embodiment for registering an environmental password and authenticating a terminal.
Figure 13:
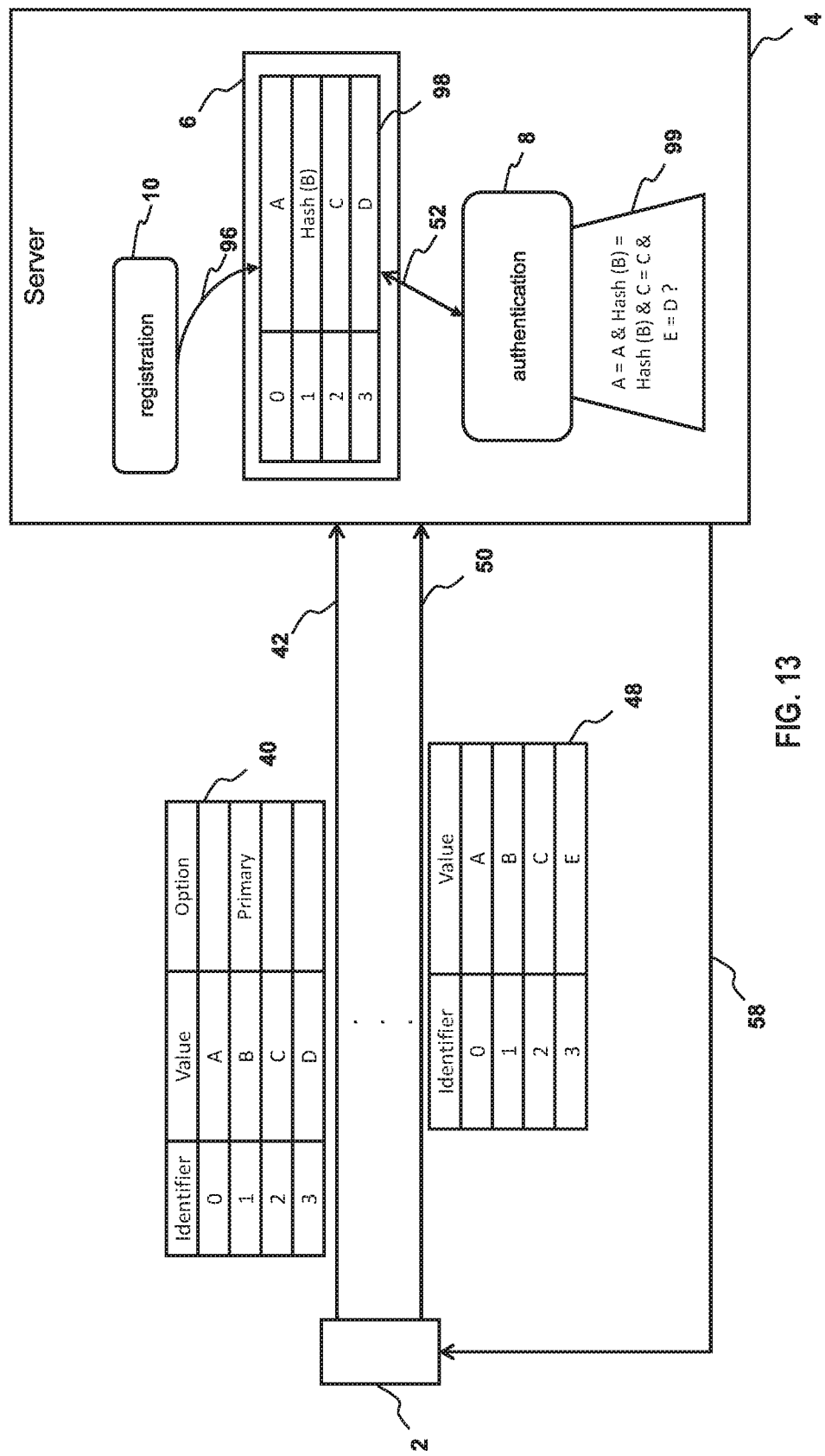

Fourth Implementation Embodiment (FIGS. 12 and 13): Primary and Secondary Environmental Factors The fourth implementation embodiment is a mixture between the first implementation embodiment and the third implementation embodiment (FIG. 12) and/or between the second implementation embodiment and the third implementation embodiment (FIG. 13). At least one of the environmental factors is defined to be a primary environmental factor, while the other environmental factors are defined to be secondary factors. The values of the primary environmental factors are either merged according to the first implementation embodiment or hashed according to the second implementation embodiment as described above. The values of the secondary environmental factors are stored in an unhashed manner (in encrypted form in some embodiments) in accordance with the third implementation embodiment as described above.

Hence, the registration environmental authentication information 40 comprises respective individual authentication information (values of the environmental factors) for at least two first of the multiple environmental factors, i.e. the primary environmental factors. The at least two first multiple environmental factors belong to the plurality of the multiple environmental factors as introduced above, i.e. they are subject to a later comparison by the server in order to authenticate the terminal. As shown by FIGS. 12 and 13, the registration environmental authentication information 40 may also include an indication which environmental factors are defined to be primary environmental factors (option: primary). In addition, the registration environmental authentication information 40 comprises the identifier and the value of at least one second of the multiple environmental factors, the one or more secondary environmental factors. The at least one second environmental factor also belongs to the plurality of the multiple environmental factors.

During the registration phase, in response to receiving the registration environmental authentication information 40, the server 4 merges the individual authentication information (values) for the at least two first multiple environmental factors included in the received registration environmental authentication information 40 to form a discrete registration authentication string as described above with reference to the first implementation embodiment. The server 4 stores the discrete registration authentication string (linked to the corresponding identifiers) and the identifier and the value of the at least secondary multiple environmental factor included in the received registration environmental authentication information 40, to form stored registration environmental authentication information 92. Merging and storing are visualized by arrow 90 in FIG. 12.

During the authentication phase, the current environmental authentication information 48 comprises again respective individual authentication information (values) for the at least two first environmental factors as well as the identifier and the value for the at least one second multiple environmental factor. In response to receiving the current environmental authentication information 48 with authentication request 50, the server again merges the individual authentication information for the at least two first multiple environmental factors included in the received current environmental authentication information 48 to form a discrete current authentication string. The server 4 then compares 94 the merged discrete current authentication string with the stored discrete registration authentication string retrieved 52 from the stored registration environmental authentication information 92 and the value of the at least second multiple environmental factor included in the received current environmental authentication information 48 with the corresponding stored value of the at least one second multiple environmental factor. In response to determining that the discrete current authentication string is identical to the stored discrete registration authentication string and that the value of the at least one second environmental factor included in the current environmental authentication information is substantially identical with the corresponding value of the at least one second environmental factor included in the registration environmental authentication information, the server 4 authenticates 58 the terminal 2.

FIG. 13 shows an example where the values of the primary environmental factors are not merged according to the first implementation embodiment, but hashed in accordance with the second implementation embodiment. Here, the registration environmental authentication information 40 comprises individual authentication information (value) for at least one first of the multiple environmental factor, the primary environmental factor, as well as an identifier and the value of at least one second of the multiple environmental factors, the one or more secondary environmental factors. The at least one first environmental factor and the at least one second environmental factor belong to the plurality of the multiple environmental factors.

During registration, in response to receiving the registration environmental authentication information 40, the server 4 forms a respective discrete registration authentication string (hash value) for each individual authentication information included in the received registration environmental authentication information 40 as already described above with reference to the second implementation embodiment. The server 4 stores the respective discrete registration authentication strings (linked to the identifier) and the identifier and the value of the at least one second multiple environmental factor included in the received registration environmental authentication information, to form stored registration environmental authentication information 98. Forming and storing are visualized by arrow 96 in FIG. 13.

At authentication time, the current environmental authentication information 48 comprises the identifiers and the values for the at least one first and for the at least one second multiple environmental factor. In response to receiving the current environmental authentication information 48 by authentication request 50, the server 4 forms a respective discrete current registration authentication string for each value included in the received current environmental authentication information 48, retrieves 52 the stored registration environmental authentication information 98 from the database 6 and compares 99 each current discrete authentication string (hash value) with the corresponding stored discrete registration authentication string (hash values) and the value of the at least one second multiple environmental factor included in the received current environmental authentication information 58 with the corresponding stored value of the at least one second multiple environmental factor. In response to determining that each discrete current authentication string is identical with the corresponding stored discrete registration authentication string and that the value of the at least one second environmental factor included in the current environmental authentication information is substantially identical with the corresponding value of the at least one second environmental factor included in the registration environmental authentication information 98, the server authenticates 58 the terminal 2.

The concept of progressive password is supported by the fourth implementation embodiments in a similar manner as by the first, second and third implementation embodiments already described above. With reference to FIGS. 12 and 13, an environmental factor number tolerance level and or using environmental factor number margin can be defined for the environmental authentication information and/or a tolerance level defining a range of admissible values for the values of secondary environmental factors can be defined. Comparison and potential update of the registration environmental authentication information 92 and 98 is performed as already described above with reference to FIGS. 6, 7 and 8.

In some examples, the multiple environmental factors include a classic password (string of characters) as one environmental factor. In these examples, the classic password environmental factor is defined as a primary environmental factor so that the classic password is either merged with one or more other values or one or more other primary environmental factors (FIG. 12) or hashed and stored as a hash value (FIG. 13).

The fourth implementation embodiment also supports the control factor mechanisms as already described with respect to the second and third implementation embodiment as described above.

Miscellaneous

The registration request 42, a potential registration confirmation or rejection, authentication request 50 and authentication response 58 as well as any other messages exchanged between the terminal 2 and the server 4 may be implemented any sort of suitable communication and network protocols. For example, the messages may be application packets transmitted by using the TCP/IP Internet protocol suite including packets according to protocols like HTTP or HTTPS or web service message, e.g., on the basis of SOAP, REST and others like Email or SMS/MMS. At the lower layers, the communication interface between the terminal 2 and the server 4 may be realized by various communication standards, for example by wired technologies such as Ethernet or ATM or by wireless/mobile networks such as 2G/3G/4G or WiFi (IEEE 802.11). If the server 4 is located locally at the terminal 2, any adequate communication mechanisms may be employed including TCP/IP-based messages, inter-process communication, remote procedure calls etc.

The server 4 may employ any suitable cryptographic mechanisms to securely store the registration environmental authentication information as well as temporary hash values or unhashed values implementing the progressive password concept, including symmetric encryption operation. Communication between the terminal 2 and the server 4 may be encrypted as well e.g. by using asymmetric encryption mechanisms. In addition, the requests from the terminal 2 and the responses from the server 4 may be digitally signed by a digital signature in order to ensure authenticity of the messages.

Hashing employed by the server 4 may be based on suitable hashing functions such as MD5, Secure Hash Algorithm (SHA), Password-Based Key Derivation Function 2 (PBKDF2) or others.

Figure 14:
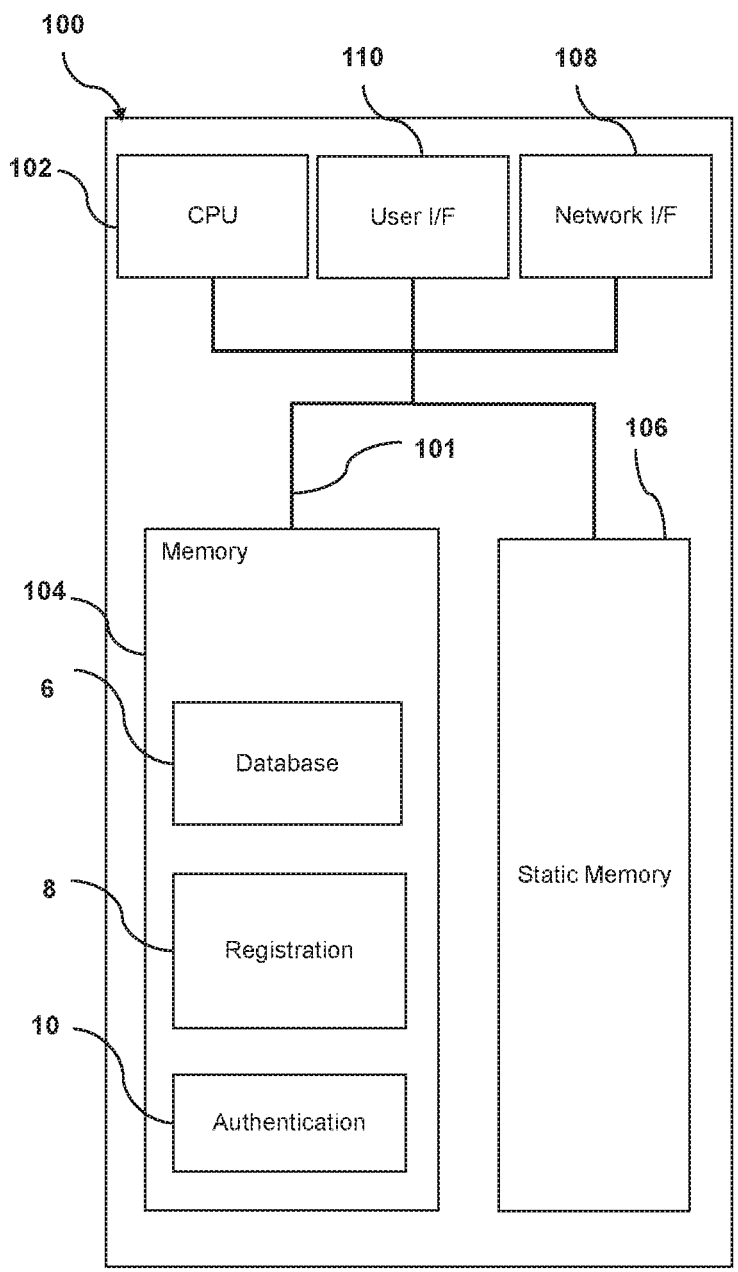
FIG. 14 is an exemplary schematic view of the internal architecture of the database table and/or a request client.

Finally, FIG. 14 is a diagrammatic example representation of a computer system 100 arranged as a terminal and/or as a server to execute a set of instructions, to cause the computer system 100 to perform any of the methodologies implementing the generation and registration of an environmental password as well as the authentication utilizing the environmental password as described above. The computer system 100 includes a processor 102, a main memory 104 and a network interface 108 which communicate with each other via a bus 101. The computer system 100 further includes a static memory 106, e.g. non-removable flash and/or solid state drive and/or a removable Micro or Mini SD card, which permanently stores the instructions enabling the computer system 100 to execute its functions, such as authentication module 8 and registration module 10, and/or the data including the environmental authentication information in the database 6. Furthermore, the computer system 100 may include a user interface 110 supported by a corresponding user interface control module.

In some examples, the instructions programmed to carry out the routines to generate an environmental password and authenticate the terminal are also stored on the static memory 106. When the instructions are executed, process data resides in the main memory 104 and/or the processor 102. The instructions may further be transmitted or received as a propagated signal through the network interface 108 from/to a software server within a local area network or the Internet. The network interface 108 may be a wireless network interface (such as a Wi-Fi and/or Bluetooth interface) and/or a 2G/3G/4G/5G mobile network interface.

The environmental password mechanisms described herein are an improved authentication concept improving information technology security and usability by basing authentication information on dynamic environmental factors. The authentication can by employed for multiple practical applications, such as local login on the terminal, login to remote servers offered by servers such as Email, password-protected web portal, webservices, etc.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method for authenticating a terminal with a server based on multiple environmental factors, wherein each of the multiple environmental factors relate to a configurable hardware-independent characteristic of the terminal, wherein each of the multiple environmental factors is defined at least by an identifier and a value, wherein the identifier identifies a respective environmental factor and the value indicates a state of the respective configurable hardware-independent characteristic, wherein the multiple environmental factors constitute an environmental authentication information for authenticating the terminal with the server, wherein the method is performed by the terminal and comprises:
   registering, at first point of time, a registration environmental authentication information of the terminal by:
      extracting, for each of the multiple environmental factors, the respective state of the related configurable hardware-independent characteristic of the terminal at the first point of time and setting the respective value of each of the multiple environmental factors depending on the respective state at the first point of time,
      generating the registration environmental authentication information based on the values of the multiple environmental factors set at the first point of time, and
      sending the registration environmental authentication information to the server for storing the registration environmental authentication information; and
   authenticating the terminal with the server at a second point of time later than the first point of time by:
      extracting, for at least a plurality of the multiple environmental factors, the respective state of the related configurable hardware-independent characteristic of the terminal at the second point of time and setting the respective value of each of the plurality of the multiple environmental factors depending on the respective state at the second point of time,
      generating a current environmental authentication information based on the values of the multiple environmental factors set at the second point of time, and
      sending the current environmental authentication information to the server for authenticating the terminal with the server.

2. The method of claim 1 wherein the configurable hardware-independent characteristics of the terminal include a storage content of the terminal, software processes currently running on the terminal, software programs installed on the terminal, an operating system of the terminal, a current state of a web browser application currently executed by the terminal, one or more aspects of a current system configuration of the terminal, a connection to an external storage drive, one or more currently opened files, and a user input, a fingerprint, one or more gestures input by the user via the terminal, or a combination thereof.

3. The method of claim 1 wherein at least one of the multiple environmental factors is defined as a control factor when registering the registration environmental authentication information, and the at least one control factor determines conditions for applying other environmental factors of the multiple environmental factors when authenticating the terminal with the server.

4. The method of claim 3 wherein the at least one control factor is defined as a presence-condition factor when registering the registration environmental authentication information, and an absence or a presence of the presence-condition factor in the current authentication information determines which environmental factors of the multiple environmental factors form the plurality of the multiple environmental factors when authenticating the terminal with the server.

5. The method of claim 3 wherein the at least one control factor is defined as a value-condition factor when registering the registration environmental authentication information, wherein the value of the value-condition factor included in the current authentication information determines which environmental factors of the multiple environmental factors form the plurality of the multiple environmental factors when authenticating the terminal with the server.

6. The method of claim 1 wherein at least one of the multiple environmental factors is additionally defined by a tolerance level defining a range of admissible values of the at least one environmental factor within which the terminal is successfully authenticated.

7. A method for authenticating a terminal with a server based on multiple environmental factors of the terminal, wherein the method is performed by the server and comprises:
   registering, at a first point of time, a registration environmental authentication information for authenticating the terminal with the server by:
      receiving the registration environmental authentication information from the terminal, the registration environmental authentication information comprising a plurality of environmental factors that each relate to a configurable hardware-independent characteristic of the terminal, wherein each environmental factor of the plurality of environmental factors is defined by an identifier that identifies a respective environmental factor and a value that indicates a state of a given configurable hardware-independent characteristic related to the respective environmental factor, and storing the registration environmental authentication information;

authenticating the terminal at a second point of time later than the first point of time by:
receiving a current environmental authentication information from the terminal,
comparing values for each configurable hardware-independent characteristic state extracted from the received current environmental authentication information with corresponding values in the stored registration environmental authentication information, and
in response to determining that the current environmental authentication information is substantially identical to the registration environmental authentication information, authenticating the terminal.

8. The method of claim 7 further comprising:
in response to receiving the registration environmental authentication information, merging the received registration environmental authentication information to form a discrete registration authentication string;
storing the discrete registration authentication string;
in response to receiving the current environmental authentication information, merging the received current environmental authentication information to form a current discrete authentication string,
comparing the current discrete authentication string with the stored discrete registration authentication string;
in response to determining that the current discrete authentication string is identical to the stored discrete registration string, authenticating the terminal.

9. The method of claim 7 wherein the registration environmental authentication information comprises individual authentication information for each of the multiple environmental factors and the current environmental authentication information comprises individual authentication information for each of a plurality of the multiple environmental factors, and further comprising:
in response to receiving the registration environmental authentication information, forming a respective discrete registration authentication string for each individual authentication information includes the received registration environmental authentication information;
storing each of the discrete registration authentication strings;
in response to receiving the current environmental authentication information, forming a respective discrete current authentication string for each individual authentication information included in the received current environmental authentication information;
comparing each of the current discrete authentication strings with the corresponding stored discrete registration authentication string; and
in response to determining that at least a given number of the current discrete authentication strings is identical to the corresponding stored discrete registration string, authenticating the terminal.

10. The method of claim 7 wherein the registration environmental authentication information comprises the respective identifier and value of each of the multiple environmental factors and the current environmental authentication information comprises the respective identifier and value for each of a plurality of the multiple environmental factors, and further comprising:

in response to receiving the registration environmental authentication information, storing the respective identifier and value of each of the multiple environmental factors included in the registration environmental authentication information;
in response to receiving the current environmental authentication information, comparing each of the values of the plurality of the multiple environmental factors included in the current environmental authentication information with the corresponding stored value of the multiple environmental factors included in the registration environmental authentication information; and
in response to determining that at least a given number of the respective values of the plurality of the multiple environmental factors included in the current environmental authentication information is substantially identical with the corresponding stored value of the multiple environmental factors included in the registration environmental authentication information, authenticating the terminal.

11. The method of claim 10 wherein at least one of the multiple environmental factors is additionally defined by a tolerance level defining a range of admissible values of the at least one environmental factor, wherein the registration environmental authentication information comprises the tolerance level, and wherein the server determines that the value of the at least one environmental factor included in the current environmental authentication information is substantially identical to the corresponding stored value of the at least one environmental factor included in the registration environmental authentication information in response to determining that the value of the at least one environmental factor included in the current environmental authentication information is within the range of admissible values defined by the tolerance level.

12. The method of claim 11 further comprising:
updating the value of the at least one environmental factor included in the stored registration environmental authentication information with the value of the at least one environmental factor included in the current environmental authentication information in response to determining that the value of the at least one environmental factor included in the current environmental authentication information is within the range of admissible values defined by the tolerance level, but not identical to the value of the at least one environmental factor included in the stored registration environmental authentication information.

13. The method of claim 7 wherein the registration environmental authentication information comprises respective individual authentication information for at least two first of the multiple environmental factors, wherein the at least two first multiple environmental factors belong to the plurality of the multiple environmental factors and the current environmental authentication information comprises respective individual authentication information for the at least two first environmental factors, wherein the registration environmental authentication information comprises the value of at least one second of the multiple environmental factors, wherein the at least one second environmental factor belongs to the plurality of the multiple environmental factors and the current environmental authentication information comprises the value for the at least one second multiple environmental factor, and wherein the method further comprises:
in response to receiving the registration environmental authentication information, merging the individual authentication information for the at least two first multiple environmental factors included in the received registration environmental authentication information to form a discrete registration authentication string;

storing the discrete registration authentication string and the value of the at least second multiple environmental factor included in the received registration environmental authentication information;

in response to receiving the current environmental authentication information, merging the individual authentication information for the at least two first multiple environmental factors included in the received current environmental authentication information to form a discrete current authentication string;

comparing the discrete current authentication string with the stored discrete registration authentication string and the value of the at least second multiple environmental factor included in the received current environmental authentication information with the corresponding stored value of the at least one second multiple environmental factor; and in response to determining that the discrete current authentication string is identical to the stored discrete registration authentication string and that the value of the at least one second environmental factor included in the current environmental authentication information is substantially identical with the corresponding value of the at least one second environmental factor included in the registration environmental authentication information, authenticating the terminal.

14. The method of claim 13 wherein the registration environmental authentication information comprises the identifier and the value of at least two second environmental factors, wherein the at least two second environmental factors belong to the plurality of the multiple environmental factors and the current environmental authentication information comprises the values for the at least two second multiple environmental factors, wherein the method comprises:

in response to determining that at least one of the values of the at least two second environmental factors included in the current environmental authentication information is substantially identical with the corresponding value of the at least two second environmental factors included in the registration environmental authentication information, authenticating the terminal.

15. The method of claim 7 wherein the registration environmental authentication information comprises individual authentication information for at least one first of the multiple environmental factors, wherein the at least one first multiple environmental factor belongs to the plurality of the multiple environmental factors and the current environmental authentication information comprises individual authentication information for the at least one first environmental factor, wherein the registration environmental authentication information comprises the value of at least one second of the multiple environmental factors, wherein the at least one second environmental factor belongs to the plurality of the multiple environmental factors and the current environmental authentication information comprises the value for the at least one second multiple environmental factor, and further comprising:

in response to receiving the registration environmental authentication information, forming a respective discrete registration authentication string for each individual authentication information included in the received registration environmental authentication information;

storing the respective discrete registration authentication strings and the value of the at least one second multiple environmental factor included in the received registration environmental authentication information;

in response to receiving the current environmental authentication information, forming a respective discrete current registration authentication string for each individual authentication information included in the received current environmental authentication information;

comparing each current discrete authentication string with the corresponding stored discrete registration authentication string and the value of the at least one second multiple environmental factor included in the received current environmental authentication information with the corresponding stored value of the at least one second multiple environmental factor; and in response to determining that each discrete current authentication string is identical with the corresponding stored discrete registration authentication string and that the value of the at least one second environmental factor included in the current environmental authentication information is substantially identical with the corresponding value of the at least one second environmental factor included in the registration environmental authentication information, authenticating the terminal.

16. A terminal for authentication with a server based on multiple environmental factors, wherein each of the multiple environmental factors relates to configurable hardware-independent characteristics of the terminal, wherein each of the multiple environmental factors is defined at least by an identifier and a value, wherein the identifier identifies a respective environmental factor and the value indicates a state of the respective configurable hardware-independent characteristic, wherein the multiple environmental factors constitute an environmental authentication information for authenticating the terminal with the server, wherein the terminal is arranged to:

register, at first point of time, a registration environmental authentication information of the terminal by:

extracting, for each of the multiple environmental factors, the respective state of the related configurable hardware-independent characteristic of the terminal at the first point of time and setting the respective value of each of the multiple environmental factors depending on the respective state at the first point of time, generating the registration environmental authentication information based on the values of the multiple environmental factors set at the first point of time, and sending the registration environmental authentication information to the server for storing the first environmental authentication information; and authenticate the terminal with the server at a second point of time later than the first point of time, by:

extracting, for at least a plurality of the multiple environmental factors, the respective state of the related configurable hardware-independent characteristic of the terminal at the second point of time and setting the respective value of each of the plurality of the multiple environmental factors depending on the respective state at the second point of time;

generating a current environmental authentication information based on the values of the multiple environmental factors set at the second point of time; and sending the current environmental authentication information to the server for authenticating the terminal with the server.

17. A server for authenticating a terminal based on multiple environmental factors of the terminal, wherein the server includes a processor and a main memory, wherein each of the multiple environmental factors relates to a configurable hardware-independent characteristic of the terminal, wherein each of the multiple environmental factors is defined at least by an identifier and a value, wherein the identifier identifies a respective environmental factor and the value indicates a state of the respective configurable hardware-independent characteristic, and wherein the multiple environmental factors constitute an environmental authentication information for authenticating the terminal with the server, and wherein the server is arranged to:

register, at a first point of time, a registration environmental authentication information for authenticating the terminal with the server, by:

receiving the registration environmental authentication information from the terminal the registration environmental authentication information comprising a plurality of environmental factors that each relate to a configurable hardware-independent Characteristic of the terminal wherein each environmental factor of the plurality of environmental factors is defined by an identifier that identifies a respective environmental factor and a value that indicates a state of a given configurable hardware independent characteristic related to the respective environmental factor, and storing the registration environmental authentication information; authenticate the terminal at a second point of time later than the first point of time, by: receiving a current environmental authentication information from the terminal, comparing values for each configurable hardware-independent characteristic state extracted from the received current environmental authentication information with corresponding values in the stored registration environmental authentication information, and in response to determining that the current environmental authentication information is substantially identical to the registration environmental authentication information, authenticating the terminal.

* * * * *